US009515756B2

(12) United States Patent
Khoury et al.

(10) Patent No.: US 9,515,756 B2
(45) Date of Patent: Dec. 6, 2016

(54) ADAPTIVE PRECISION TIMING CONTROL IN A COMMUNICATION SYSTEM

(75) Inventors: Peter G. Khoury, San Francisco, CA (US); Jeffery A. Gardner, Mountain View, CA (US); Peter J. Roman, Belmont, CA (US)

(73) Assignee: SpiderCloud Wireless, Inc., Milpitas, CA (US)

( * ) Notice: Subject to any disclaimer, the term of this patent is extended or adjusted under 35 U.S.C. 154(b) by 1158 days.

(21) Appl. No.: 13/302,583

(22) Filed: Nov. 22, 2011

(65) Prior Publication Data

US 2012/0136956 A1 May 31, 2012

Related U.S. Application Data

(60) Provisional application No. 61/417,848, filed on Nov. 29, 2010.

(51) Int. Cl.
*G06F 15/16* (2006.01)
*H04J 3/06* (2006.01)
*H04W 28/06* (2009.01)

(52) U.S. Cl.
CPC ............ *H04J 3/0667* (2013.01); *H04W 28/06* (2013.01)

(58) Field of Classification Search
CPC .................................................. H04W 28/06
USPC ....................................................... 709/248
See application file for complete search history.

(56) References Cited

U.S. PATENT DOCUMENTS

| | | | | |
|---|---|---|---|---|
| 6,157,957 A | * | 12/2000 | Berthaud ...................... 709/248 |
| 7,068,746 B1 | * | 6/2006 | Stichter ................. H04J 3/0667 375/356 |
| 7,916,758 B2 | * | 3/2011 | Sun et al. ..................... 370/503 |
| 8,018,972 B2 | * | 9/2011 | Roberts et al. ............... 370/507 |
| 8,081,663 B2 | * | 12/2011 | Tamura ........................ 370/503 |
| 8,259,758 B2 | * | 9/2012 | Chen et al. ................... 370/503 |
| 8,370,675 B2 | * | 2/2013 | Kagan ........................... 713/400 |
| 8,462,821 B1 | * | 6/2013 | Sagarwala ........... H04J 3/0667 370/503 |
| 8,549,341 B2 | * | 10/2013 | Shahid et al. ................. 713/500 |
| 8,923,346 B2 | * | 12/2014 | Li ............................ G04G 7/02 370/510 |
| 2004/0141526 A1 | * | 7/2004 | Balasubramanian et al. .............................. 370/503 |
| 2007/0008993 A1 | * | 1/2007 | Cha et al. ..................... 370/509 |
| 2007/0266119 A1 | * | 11/2007 | Ohly ............................. 709/220 |
| 2008/0031283 A1 | * | 2/2008 | Curran-Gray ......... H04J 3/0667 370/503 |
| 2008/0298398 A1 | * | 12/2008 | Eidson .......................... 370/503 |
| 2009/0086764 A1 | * | 4/2009 | Lee et al. ...................... 370/503 |
| 2010/0085989 A1 | * | 4/2010 | Belhadj ................ H04J 3/0667 370/503 |
| 2010/0098111 A1 | * | 4/2010 | Sun et al. ..................... 370/509 |
| 2010/0103781 A1 | * | 4/2010 | Rai ....................... H04J 3/0667 368/55 |
| 2010/0329125 A1 | * | 12/2010 | Roberts ................ H04J 3/0667 370/241.1 |
| 2011/0013737 A1 | * | 1/2011 | Lee et al. ...................... 375/356 |
| 2011/0019699 A1 | * | 1/2011 | Sun et al. ..................... 370/509 |
| 2011/0035511 A1 | * | 2/2011 | Biederman ................... 709/248 |
| 2011/0052206 A1 | * | 3/2011 | Zheng ........................... 398/154 |

(Continued)

*Primary Examiner* — Guang Li
(74) *Attorney, Agent, or Firm* — TechLaw LLP

(57) ABSTRACT

Methods, devices, and computer program products facilitate establishing timing synchronization between two network entities. The timing information is exchanged between a slave device and a master device at the discretion of the slave device. The exchange of timing information can, therefore, be conducted adaptively based on the needs of the salve device. The timing information is also exchanged using fewer messages, thereby reducing network traffic, reducing overhead and facilitating synchronization acquisition.

34 Claims, 12 Drawing Sheets

(56) References Cited

U.S. PATENT DOCUMENTS

| | | | |
|---|---|---|---|
| 2011/0087803 A1* | 4/2011 | Sun et al. | 709/248 |
| 2012/0263195 A1* | 10/2012 | Li | G04G 7/02 370/510 |
| 2013/0170507 A1* | 7/2013 | Hsueh | H04L 63/0428 370/503 |
| 2015/0188691 A1* | 7/2015 | Mizuguchi | H04J 3/0667 375/355 |

* cited by examiner

ADAPTIVE PRECISION TIMING CONTROL IN A COMMUNICATION SYSTEM

RELATED APPLICATIONS

The present invention claims priority to U.S. provisional application Ser. No. 61/417,848, entitled ADAPTIVE PRECISION TIMING CONTROL IN A COMMUNICATION SYSTEM, filed Nov. 29, 2010, which is incorporated in its entirety herein by reference.

FIELD OF INVENTION

The present invention relates generally to the field of data communications. More particularly, the present invention relates to the exchange of timing information between two entities in a communication network.

BACKGROUND

This section is intended to provide a background or context to the embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Synchronization between various entities in a wireless communication network is often essential for proper operations of many communication networks. To this end, many systems and protocols mandate strict frequency and/or timing synchronization requirements. One example of such a requirement can be found in the third generation partnership project (3GPP) revision 6 protocol, which requires that a base station within a wireless communication network maintain a carrier frequency value that is accurate to within 50 parts per billion (ppb).

One method of achieving synchronization in a packet network is to connect a highly accurate clock, called a master clock, to the network and allow it to exchange timing information (e.g., the current time at the master clock) across the network with other less accurate and less expensive clocks, called slave clocks. The timing information that is sent across such networks, however, is subject to transit delays due to the time it takes for the timing information to reach its destination. Such transit delays can vary from one transit instance to another and are, therefore, treated as random numbers. In order to acquire and maintain synchronization between the master and slave clocks, the timing information is exchanged on an ongoing basis, which enables statistical analysis of the collected data to provide estimates of the transit delay values.

The exchange of large amounts of timing information, however, can reduce the signaling capacity of the network and result in the consumption of valuable computational and memory resources at entities that operate within such networks. Moreover, the exchange of such timing information is sometimes carried out on a regular basis, without much consideration as to an actual need of such timing information for a particular network entity and/or the capacity of such a network entity to store and process the received timing information.

SUMMARY

The disclosed embodiments relate to systems, methods, devices, and computer program products that facilitate the exchange of timing information between different entities of a network. According to the disclosed embodiments, synchronization between network entities can be properly maintained while minimizing the number of times timing information is communicated between such network entities. One aspect of the disclosed embodiments relates to a method that includes transmitting one or more requests from a slave device to a master device in a communication network, where each request has a corresponding request transmit initiation time and a request reception time. This method further includes, in response to each of the transmitted requests, receiving a melded response, where each melded response has a corresponding response transmit initiation time and a response reception time. Further, each melded response comprises a first value representing the request reception time and a second value representing the response transmit initiation time. The above-noted method also includes establishing, at the slave device, a timing synchronization between the slave device and the master device in accordance with the request transmit initiation time, the request reception time, the response reception time and the response transmit initiation time.

In one embodiment, the one or more requests are transmitted based on a transmission rate determined by the slave device. In another embodiment, the timing synchronization is assessed after collecting at least a single set of the request transmit initiation time, the request reception time, the response reception time and the response transmit initiation time. In yet another embodiment, the transmission rate is modified after collecting at least a single set of the request transmit initiation time, the request reception time, the response reception time and the response transmit initiation time. In still another embodiment, the transmission rate is changeable within a discrete range of transmission rate values with small granularity. In one embodiment, the transmission rate is modified by the slave device without negotiating with the master device. In another embodiment, the transmission rate is determined in accordance with a timing synchronization status of the slave clock, a processing capability of the slave clock and/or a network condition.

According to another embodiment, the melded response further comprises the request transmit initiation time. In one embodiment, upon the reception of the melded response, a value representing the response reception time is incorporated into the melded response. In another embodiment, the above noted method further includes receiving a follow up message, where the follow up message comprises a hardware generated value of the response transmit initiation time.

According to another embodiment, the timing synchronization is established by first collecting a plurality of request transmit initiation times, request reception times, request reception times and the response transmit initiation times, and next, conducting a statistical operation to produce an estimation of a synchronization parameter. In one embodiment, the synchronization parameter that is estimated is an offset parameter representing a difference between timing measurements conducted at the slave device and timing measurements conducted at the master device. In this embodiment, the statistical operation comprises generating an expected value of the offset parameter.

Another aspect of the disclosed embodiments relates to a method that comprises receiving one or more requests from a slave device at a master device in a communication network, each request having a corresponding request transmit initiation time and a request reception time. This method also include, in response to each request, transmitting a melded response, where each melded response has a corresponding response transmit initiation time and a response reception time, and where each melded response comprises a first value representing the request reception time and a second value representing the response transmit initiation time. According to this method, a timing synchronization between the slave device and the master device can be established at the slave device in accordance with the request transmit initiation time, the request reception time, the response reception time and the response transmit initiation time.

Another aspect of the disclosed embodiments relates to a method that comprises transmitting one or more requests from a slave device to a master device in a communication network, where each request having a corresponding request transmit initiation time and a request reception time. This method further includes, in response to each transmitted request, receiving a melded response, where each melded response comprises a first value representing the request reception time. In response to each transmitted request, this method further includes receiving a synchronization message, where each synchronization message has a corresponding synchronization transmit initiation time and a synchronization reception time, and where each synchronization message comprises a value representing the synchronization transmit initiation time. Such a method further includes establishing, at the slave device, a timing synchronization between the slave device and the master device in accordance with the request transmit initiation time, the request reception time, the synchronization reception time and the synchronization transmit initiation time.

Another aspect of the disclosed embodiments relates to a method that comprises receiving one or more requests from a slave device at a master device in a communication network, where each request has a corresponding request transmit initiation time and a request reception time. This method further includes, in response to each transmitted request, transmitting a melded response, where each melded response comprises a first value representing the request reception time. In response to each transmitted request, this method further includes transmitting a synchronization message, where each synchronization message has a corresponding synchronization transmit initiation time and a synchronization reception time, and each synchronization message comprises a value representing the synchronization transmit initiation time. Additionally, a timing synchronization between the slave device and the master device is established at the slave device in accordance with the request transmit initiation time, the request reception time, the synchronization reception time and the synchronization transmit initiation time.

Another aspect of the disclosed embodiments relates to a method that comprises transmitting one or more synchronization requests from a slave device to a master device in a communication network. This method further includes, in response to each transmitted synchronization request, receiving a synchronization response, where each synchronization response has a synchronization transmit initiation time and a synchronization reception time, and where each synchronization response comprises a value representing the synchronization transmit initiation time. This method further includes transmitting a delay request to the master device, where each delay request has a delay request transmit initiation time and a delay request reception time, and receiving a delay response message, where each delay response message comprises a value representing the delay request transmit initiation time. This method additionally includes establishing, at the slave device, a timing synchronization between the slave device and the master device in accordance with the synchronization transmit initiation time, the synchronization reception time, the delay request transmit initiation time and the delay request reception time.

Another aspect of the disclosed embodiments relates to a method that comprises receiving one or more synchronization requests from a slave device at a master device in a communication network. The method further includes, in response to each received synchronization request, transmitting a synchronization response, where each synchronization response has a synchronization transmit initiation time and a synchronization reception time, and where each synchronization response comprises a value representing the synchronization transmit initiation time. This method further includes receiving a delay request to the master device, where each delay request has a delay request transmit initiation time and a delay request reception time, and transmitting a delay response message, where each delay response message comprises a value representing the delay request transmit initiation time. Further, according to this method, a timing synchronization between the slave device and the master device is established at the slave device in accordance with the synchronization transmit initiation time, the synchronization reception time, the delay request transmit initiation time and the delay request reception time.

Another aspect of the disclosed embodiments relates to a method that comprises transmitting one or more requests from a slave device to a master device in a communication network, where the one or more requests are transmitted at a transmission rate determined by the slave device without negotiating with the master device. Further, each request has a corresponding request transmit initiation time and a request reception time. This method further comprises, in response to each of the transmitted requests, receiving a delay response, where each delay response comprises a value representing the request reception time. In addition, in response to each of the transmitted requests, a synchronization response is received, where each synchronization response has a synchronization transmit initiation time and a synchronization reception time. Each synchronization response also comprises a value representing the synchronization transmit initiation time. The above noted method further comprises establishing, at the slave device, a timing synchronization between the slave device and the master device in accordance with the request transmit initiation time, the request reception time, the synchronization transmit initiation time and the synchronization reception time.

Another aspect of the disclosed embodiments relates to a method that comprises receiving one or more requests from a slave device at a master device in a communication network, where the one or more requests are received at a rate determined by the slave device without negotiating with the master device. Further, each request has a corresponding request transmit initiation time and a request reception time. This method further comprises, in response to each of the received requests, transmitting a delay response, where each delay response comprising a value representing the request reception time. In addition, in response to each of the transmitted requests, a synchronization response is transmitted, where each synchronization response has a synchronization transmit initiation time and a synchronization reception time. Each synchronization response also comprises a value representing the synchronization transmit initiation time. According to this method, a timing synchronization between the slave device and the master device can be established at the slave device in accordance with the request transmit initiation time, the request reception time, the synchronization transmit initiation time and the synchronization reception time.

The above-noted methods can be implemented as computer program products, embodied on a non-transitory computer readable media, that comprise program code for carrying out the various disclosed operations. Moreover, the disclosed embodiments can be implemented as devices that comprise a processor and a memory that includes processor executable code. The processor executable code, when executed by the processor, configures the device to carryout the various operations such as transmission and/or reception of messages to/from slave or master devices.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. Moreover, certain embodiments are described herein with reference to the term user equipment. A user equipment (UE) can also be called a user terminal and can include some or all of the functionalities of a mobile station, a mobile wireless terminal, a mobile device, a wireless communication device and the like. It should also be noted that certain disclosed embodiments can be implemented within exemplary wireless radio communication systems, such as High Speed Packet Access (HSPA), Global System for Mobile Communications (GSM), Enhanced Data rates for GSM Evolution (EDGE), Code Division Multiple Access 2000 (CDMA2000) and long-term evolution (LTE) networks, and the like. However, it is understood that the disclosed embodiments can be utilized in other packet-oriented wireless or wired networks. Moreover, the disclosed embodiments can be implemented in other systems and networks that require the acquisition and maintenance of timing synchronization between two entities. By the way or example, and not by limitation, such networks include theatre and home audio and video networks.

Figure 1:
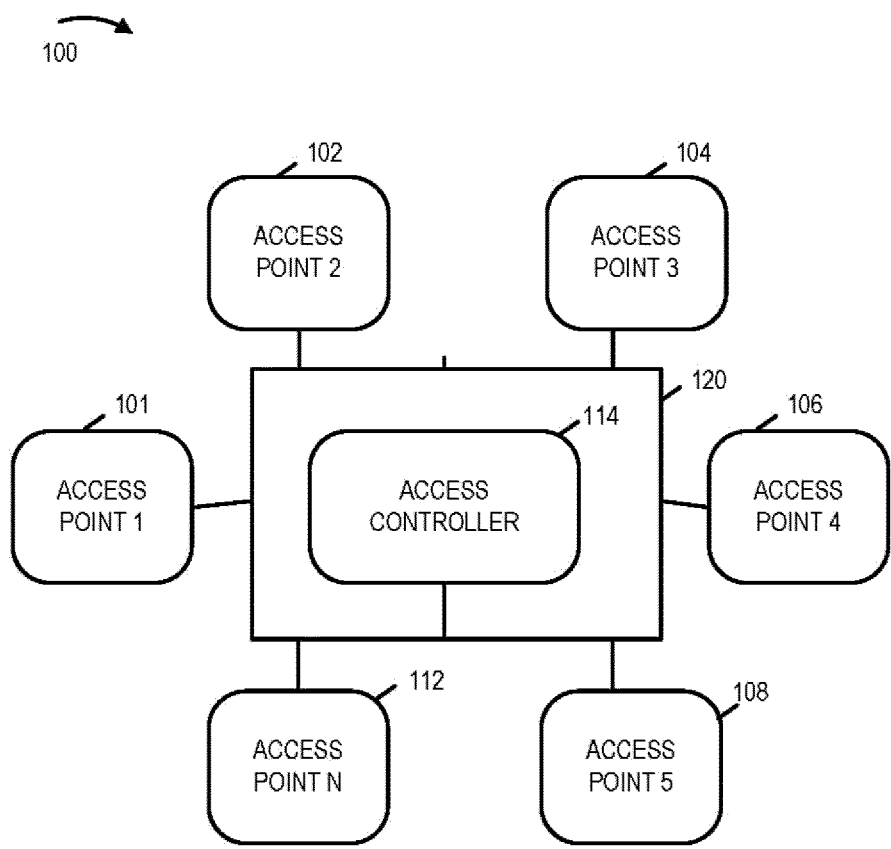
FIG. 1 illustrates an exemplary network within which the disclosed embodiments can be implemented.

FIG. 1 illustrates an exemplary system 100 which may be used to accommodate some or all of the disclosed embodiments. The system 100 can, for example, be a self-configuring enterprise network. The system 100 includes a plurality of access points referenced as 101, 102, 104, 106, 108 and 112. The access points that are illustrated in FIG. 1 are connected, directly or indirectly, to an access controller 114 through connection 120. Each of the access points 101, 102, 104, 106, 108 and 112 is herein referred to as an "internal access point" (or an "internal radio node"). Each internal access point may communicate with a plurality of UEs, as well as other access points. In an example embodiment, the access controller 114 includes a master clock (not shown) and one or more of the access points 101 to 112 include a slave clock (not shown). Further, the access controller 114 may be in communication with other access controllers and/or other entities in the network. In such a scenario, the master clock, which resides in the access controller 114, may itself be synchronized with another clock that resides within other access controllers and/or other network entities. As such, the clock that resides in the access controller 114 may operate as a slave clock that communicates with a more reliable master clock in the network.

It should be noted that while FIG. 1 illustrates a single central controller 114 that is distinct from the access points, it is also possible that the access controller is implemented as part of one or more access points. Further, the various embodiments of the present invention may also be implemented using a peer-to-peer network of access points, where each access point can initiate certain transmissions, including commands and/or data, to other access points without the involvement of a central controller. Thus, the clock in each peer access point may operate as either the master or the slave clock relative to another peer access point's clock. It should be also noted that throughout this disclosure, the terms access point, base station, radio node, cell, Node B and eNode B may be used interchangeably to refer to the same entity within a wireless communication network.

The exemplary block diagram that is shown in FIG. 1 is representative of a single network that may be adjacent to, or partially overlapping with, other networks. The collection of these other networks, which may comprise macro-cellular networks, femtocell networks and the like, are herein referred to as the external networks. Each "external network" may comprise one or more access controllers and a plurality of "external access points" (or "external radio nodes").

Figure 2:
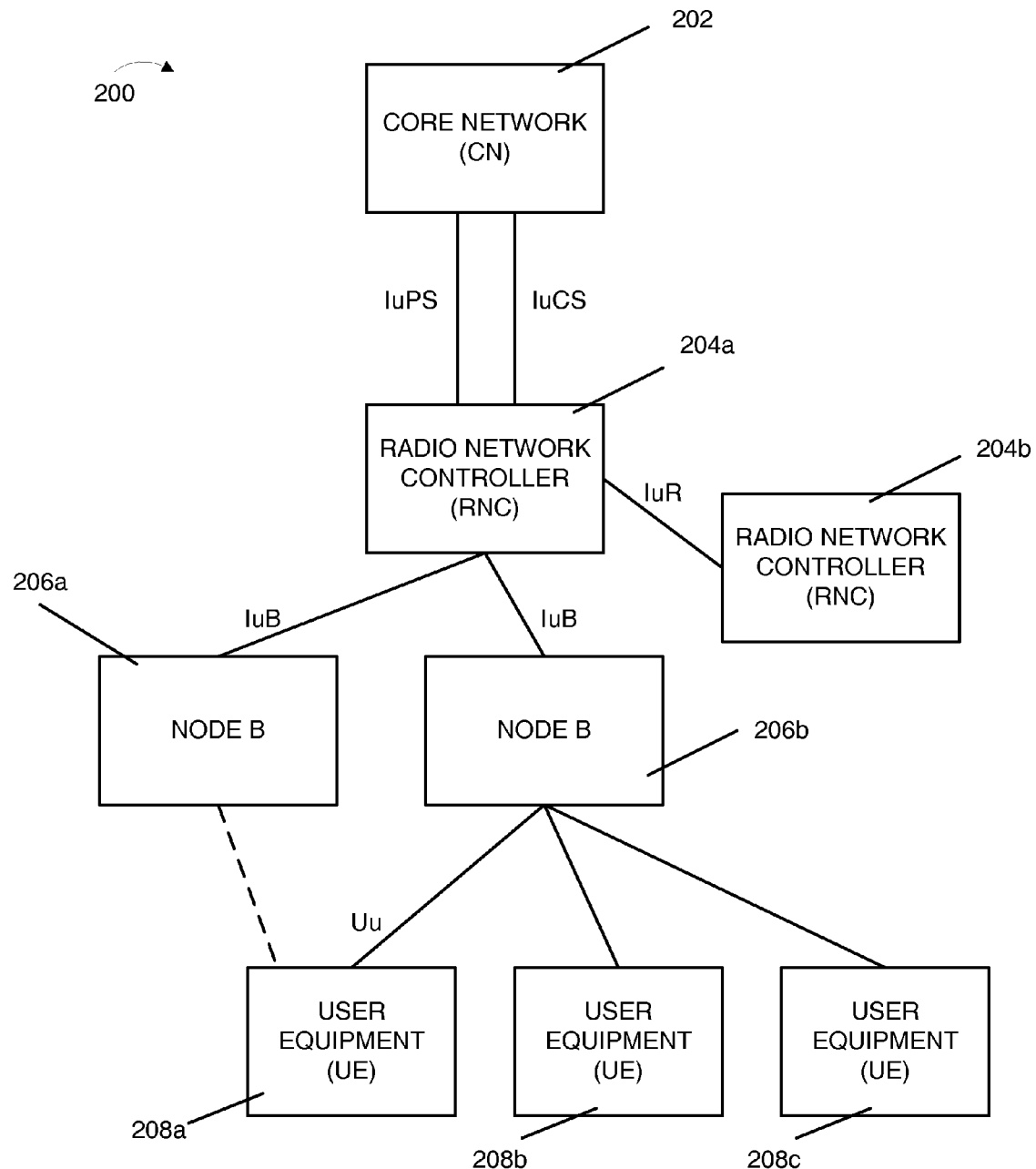
FIG. 2 illustrates another exemplary network within which the disclosed embodiments can be implemented.

FIG. 2 is another exemplary diagram of a radio network 200, such as a Universal Mobile Telecommunication System (UMTS) Terrestrial Radio Access Network (UTRAN), that can accommodate the various disclosed embodiments. The network that is depicted in FIG. 2 comprises a Core Network (CN) 202, one or more Radio Network Controllers (RNC) 204a that are in communication with a plurality of Node Bs 206a and 206b (or base stations or radio nodes) and other RNCs 204b. Each Node B 206a, 206b is in communication with one or more UEs 208a, 208b and 208c. There is one serving cell controlling the serving radio link assigned to each UE 208a, 208b and 208c. However, as illustrated in FIG. 2 with a dashed line, a UE 208a may be in communication with more than one Node B. For example, a Node B of a neighboring cell may communicate with one or more UEs of the current cell during handoffs and/or to provide overload indications. While FIG. 2 depicts an exemplary UMTS radio network, the disclosed embodiments may be extended to operate with other systems and networks such as CDMA2000, WiMAX, LTE and the like.

Each node B 206a and 206b of FIG. 2 may include a slave clock that is in communication with a master clock that resides in the RNC 204a and 204b. Further, as noted earlier, the master-slave relationship may follow a hierarchical structure, where the clocks in the RNC 204a and 204b are synchronized with more accurate clocks at a higher level.

Figure 3:
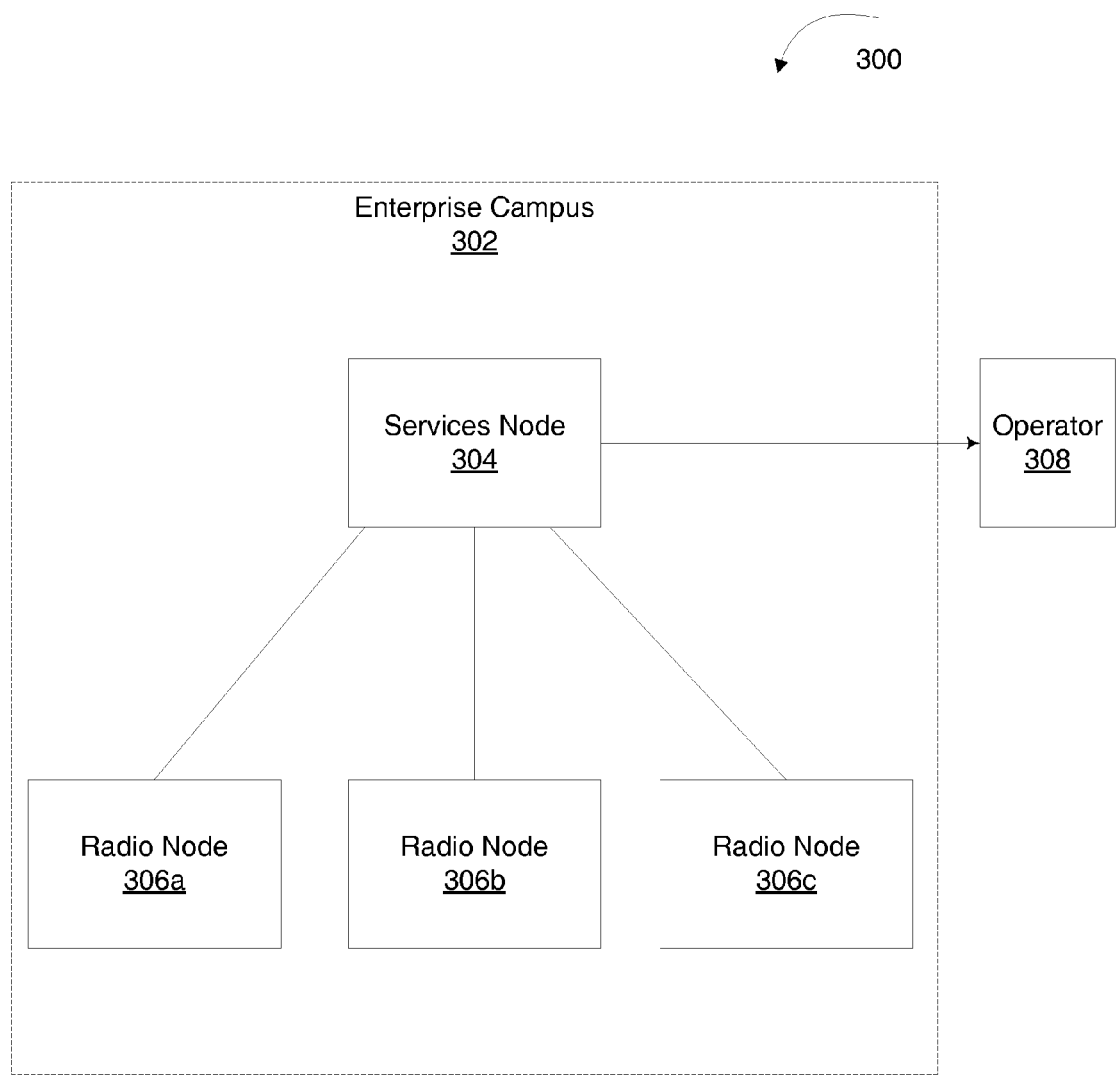
FIG. 3 illustrates another exemplary network within which the disclosed embodiments can be implemented.

FIG. 3 illustrates an exemplary Enterprise Radio Access Network (E-RAN) 300 that can be used to accommodate the various disclosed embodiments. The E-RAN 300 includes a services node 304 and a plurality of radio nodes 306a, 306b and 306c. It should be noted that the E-RAN 300 can include fewer or additional radio nodes and/or additional services nodes. The services node 304 is the central control point of the overall cluster of radio nodes 306a, 306b and 306c that are deployed throughout the enterprise campus 302. The services node 304, which can be deployed inside the enterprise local area network (LAN) provides, for example, session management for all mobile sessions delivered by the radio nodes 306a, 306b and 306c. The services node 304 can, for example, include a master clock and each of the radio nodes 306a, 306b and 306c may include a slave clock. Each of the radio nodes 306a, 306b and 306c are in communication with one or more UEs (not depicted). The radio nodes 306a, 306b and 306c can support a multi-radio architecture that allows a flexible upgrade path to higher user counts, as well as the ability to support different radio access technologies. In one example, the E-RAN 300 configuration allows the creation of a unified mobile corporate network that integrates mobile workers distributed throughout the overall enterprise domain with centrally located corporate assets.

FIG. 3 also illustrates an operator 308 that is in communication with the services node 304, which can monitor the operations of the services node 304 and can provide various input and control parameters to the services node 304. For example, the operator 308 can setup configuration space parameters for the enterprise campus 302. The interactivity between the operator 308 and the services node 304 can be provided through, for example, a command line interface (CLI) and/or industry-standard device configuration protocols, such as TR-69 or TR-196. It should be noted that while the exemplary diagram of FIG. 3 illustrates an operator 308 that is outside of the enterprise campus 302, in some embodiments, the operator 308 can reside within the enterprise campus 302. Similarly, the services node 304 can reside outside the enterprise campus 302. In some embodiments, a master clock may reside at the operator 308 site, which is in communication with a clock at the services node 302. In such a hierarchical structure, the clock at the services node 304 may operate as a slave to the clock at the operator 308 site. In some embodiments, the services node 304 does not contain a clock. In such embodiments, a master clock that resides at the operator 308 can communicate, through the services node 304, with the slave clocks that reside at the radio nodes 306a, 306b and 306c.

The exemplary radio networks that are depicted in FIGS. 1-3 all include a central controller. However, the disclosed embodiments are equally applicable to non-centralized network architectures. Such architectures can, for example, comprise isolated home Node Bs, radio nodes and/or a femtocell-based enterprise deployments that do not use a central controller.

As noted earlier, the exchange of timing information between the various entities within a network is needed to maintain synchronization between a master clock and one or more slave clocks within the network. In such networks, is often possible to obtain an estimate of the average network delay associated with the transmission of a large number of messages from a source entity to a target entity. However, the amount of network delay experienced by any particular message is uncertain and is, therefore, treated as a random variable. Typically, such a delay is assumed to be symmetric between a source entity (e.g., a master clock) and a destination entity (e.g., a slave clock).

A particular protocol for exchanging timing information over a packet network is the IEEE 1588 Precision Time Protocol (PTP). In the sections that follow, for the sake of illustration, certain references may be made to specific nomenclature of the IEEE 1588 protocol. However, it is understood that any such references are merely provided to facilitate the understanding of the underlying concepts associated with the disclosed embodiments. Therefore, the provided embodiments are equally applicable to other protocols and/or procedures that are used for the exchange of timing information in a network.

Figure 4:
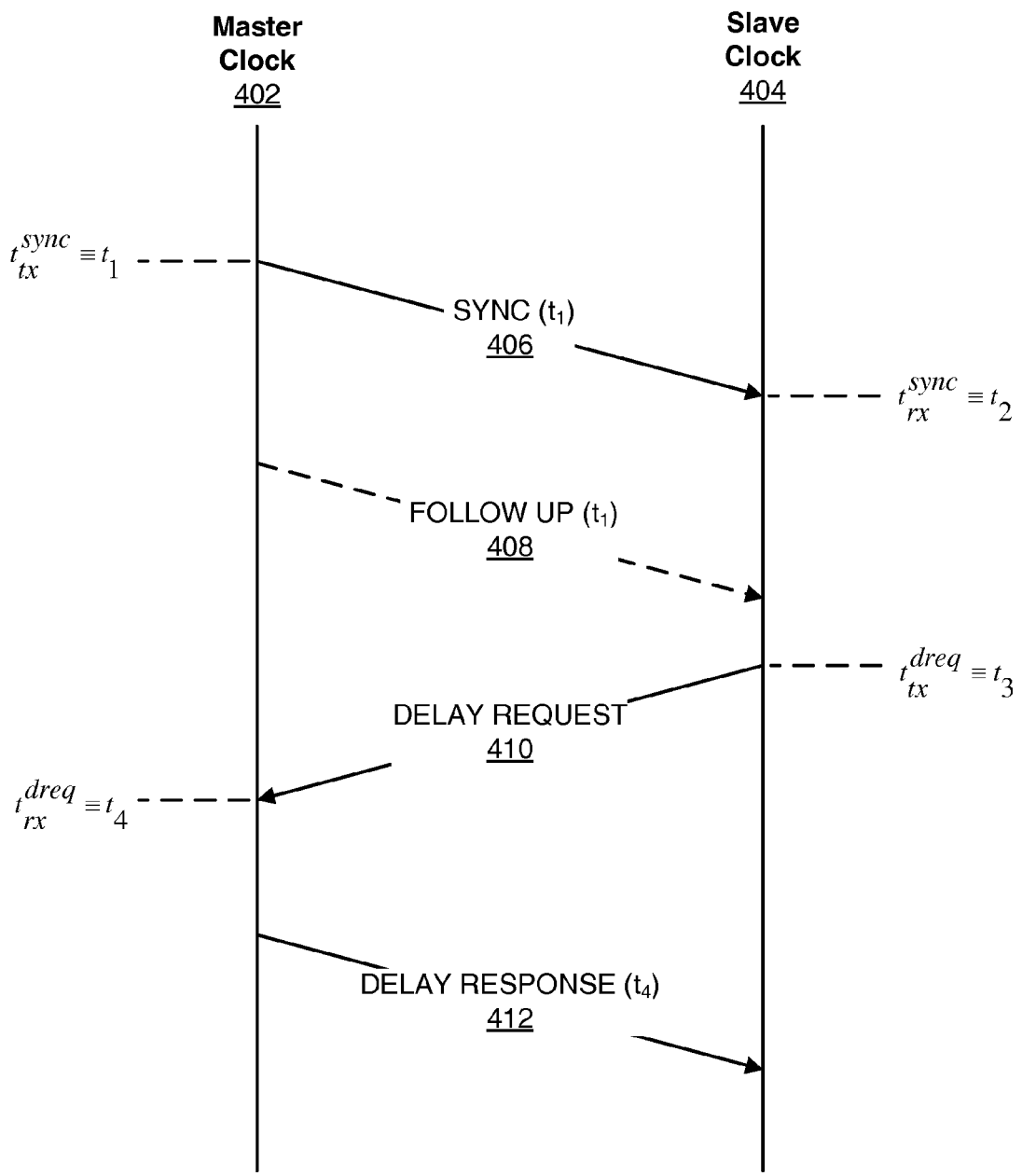
FIG. 4 is a diagram illustrating the exchange of timing information in conventional systems.

The IEEE 1588 protocol operates by exchanging of a number of specialized messages between the master and slave clocks. These messages include: SYNC, SYNC FOLLOW UP, DELAY REQUEST, and DELAY FOLLOW UP. FIG. 4 provides a pictorial representation of the above noted messages and the associated timing information that are exchanged between a master clock 402 and a slave clock 404. FIG. 4 depicts a master clock 402 and a slave clock 404. However, it is to be appreciated that the actual transmission of messages is carried out by entities that contain, among other components, the master clock 402 or the slave clock 404. Further, while FIG. 4 shows one master clock 402 and one slave clock 404, it is understood that the depicted exchange of information can take place between the master clock 402 and additional slave clocks that are not depicted in FIG. 4.

Referring back to FIG. 4, the SYNC 406 message contains a timestamp, $t_{tx}^{sync}$, embedded by the master clock 402, which represents the time at which the transmission of the SYNC 406 message was initiated. For simplicity, $t_{tx}^{sync}$ is often represented by "$t_1$." The SYNC 406 message is received at a certain time, $t_{rx}^{sync}$ (for simplicity at "$t_2$"), by the receiving slave clock 404. It should be noted that the value of $t_2$ can be inaccurate since it is measured by the slave clock 404, whereas $t_1$ is deemed to be much more accurate since it is measured by the master clock 402. Equation (1)

expresses the relationship between the time values $t_1$ and $t_2$ in terms of the en route delay (i.e., the network transit delay), $\Delta t_{delay}^{sync}$ and the time offset, $\Delta t_{offset}$, between the slave clock 404 measurements and the master clock 402 measurements:

$$t_2 = t_1 + \Delta t_{delay}^{sync} + \Delta t_{offset}, \text{ or}$$

$$t_2 - t_1 = \Delta t^{sync} = \Delta t_{delay}^{sync} + \Delta t_{offset} \quad (1).$$

In scenarios where the master clock 402 hardware does not support inclusion of timestamp $t_1$ in the SYNC 406 message (i.e., a "one-step" operation is not supported), it may be necessary to send a highly accurate hardware measurement of the timestamp, $t_1$, not within the sync packet itself, but instead within a separate message called a SYNC FOLLOW UP 408 message that is depicted in FIG. 4 (i.e., a "two-step" operation). FIG. 4 also illustrates a DELAY REQUEST 410 message that is transmitted from the slave clock 404 to the master clock 402. The DELAY REQUEST 410 message is identical to the SYNC 406 message but it operates in the reverse direction, with the slave clock 404 sending a message to the master clock 402, and with the master clock 402 noting the reception time, $t_{rx}^{dreq}$ (for simplicity at "$t_4$") of the DELAY REQUEST 410 message. Upon the reception of the DELAY REQUEST 410 message, a DELAY RESPONSE 412 message is generated and transmitted to the slave clock 404. The purpose of the DELAY RESPONSE 412 message is to provide the timing information, $t_4$, back to the slave clock 404. Similar to Equation (1), the relationship between time values $t_3$ and $t_4$ can be expressed as:

$$t_4 = t_3 + \Delta t_{delay}^{dreq} - \Delta t_{offset}, \text{ or}$$

$$t_4 - t_3 = \Delta t^{dreq} = \Delta t_{delay}^{dreq} \Delta t_{offset} \quad (2).$$

In Equation (2), $\Delta t_{delay}^{dreq}$ represents the network transit delay associated with the DELAY REQUEST 410 message. Subtracting Equation (2) from Equation (1) produces the slave clock offset, $\Delta t_{offset}$, according to the following expression:

$$\Delta t_{offset} = \frac{\Delta t^{sync} - \Delta t^{dreg} + \Delta t_{delay}^{sync} - \Delta t_{delay}^{dreg}}{2}. \quad (3)$$

It should be noted that upon the exchange of the messages that are depicted in FIG. 4, the time values $t_1$, $t_2$, $t_3$ and $t_4$ are available to the slave clock 404. In particular, the values of $t_2$ and $t_3$ are generated by the slave clock 404, whereas the time values $t_1$ and $t_4$ are transmitted to the slave clock 404 as part of the SYNC 406, FOLLOW UP 408 and DELAY RESPONSE 412 messages. The values of $t_1$, $t_2$, $t_3$ and $t_4$ (which are collectively referred to as timestamps associated with a "transaction") may be stored at a buffer or memory location that is can be accessed by the slave clock 404 for subsequent calculations.

As noted earlier, the network transit delay associated with any particular message is not known. However, one can assume that, on average, the network transit delay associated with messages sent from the master clock 402 to the slave clock 404 is equal to the delay associated with messages that are sent from the slave clock 404 to the master clock 402. This assumption of symmetry can be expressed as:

$$E(\Delta t_{delay}^{sync}) = E(\Delta t_{delay}^{dreq}) \quad (4).$$

In Equation (4), $E(x)$ represents the expected value of x. Using Equation (4), the expected value of slave clock offset, as represented by Equation (3), can be expressed as:

$$E(\Delta t_{offset}) = E\left(\frac{\Delta t^{sync} - \Delta t^{dreg}}{2}\right). \quad (5)$$

In practice, any single offset calculation is unlikely to produce an accurate result. However, a PTP servo control procedure can collect an ensemble of measurements that is statistically processed (e.g., using Equation (5)) to produce an estimate of the slave clock offset value within acceptable uncertainty bounds.

The existing timing synchronization protocols (such as the IEEE 1588 protocol) often rely on the master clock to initiate and control the exchange of timing information. In particular, a typical implementation of the IEEE 1588 protocol only provides for the transmission of SYNC messages at constant rates without considering the needs of the slave clocks, which may require different amounts of timing information at different times. For example, upon start up, a slave clock's frequency and offset can be very uncertain. In such a scenario, the slave clock often needs to accumulate a significant number of timestamps in order to have an ensemble that is statistically significant enough such that synchronization can be established to an acceptable level. The faster a slave clock can gather such data, the faster it can acquire synchronization. Once an initial synchronization is achieved and the synchronization parameters such as frequency and time offset are more certain, the slave clock often requires only a modest rate of new timing information (new transactions containing new timestamps) to maintain its synchronization on an on-going basis. The existing synchronization protocols, however, fail to properly accommodate the variable rate needs of a slave clock since they provide the timing information at a constant rate. In particular, the existing protocols can provide the timing information at a fast enough rate, which enables quick acquisition of the initial synchronization, but produces unnecessary timing data thereafter. Such unnecessary timing information can increase data management operations at the various network entities and can also increase network traffic, leading to increased network transit delays. In the alternative, the existing timing protocols can provide the timing information at a slower rate, which can reduce some of the unnecessary traffic after the timing synchronization of the slave clock has stabilized, but such a slow rate fails to enable quick acquisition and/or adjustments to the timing synchronization.

In other examples, the needs of the slave clocks may vary based on the quality of the slave clocks' components. For instance, a slave clock with a poor quality oscillator may need to receive more frequent timing information than a slave clock with a high quality oscillator. In another scenario, a slave clock that is operating in a network with significant levels of packet delay variation (e.g., due to the poor network conditions) may require a higher rate of timing information when compared with a slave clock that is connected to a network with, for example, high quality connections. Further, a slave clock that is experiencing a significant temperature swing is more likely to require receiving timing information at a higher rate as compared to a slave clock that is operating at stable temperatures.

PTP protocols must establish proper association between the time stamps of the exchanged messages. For example, in the IEEE 1588 PTP protocol that is depicted in FIG. 4, timestamp $t_1$ that is received as part of the SYNC 406 message must be paired with timestamp $t_2$. Similarly, the timestamp $t_4$ that is received as part of the DELAY RESPONSE 412 message must be paired with timestamp $t_3$. If the receive timestamp cannot be accurately paired with a transmit timestamp (e.g., due to data corruption, lack of processing and/or memory resources, and the like), then the timing information must be discarded and additional timing information packets must be exchanged. Even worse, if the information between a receive and a transmit timestamp is incorrectly paired, the PTP servo control loop will operate on the basis of incorrect timing information, which can degrade the timing synchronization and adversely, and perhaps catastrophically, affect the operations of this network entity and/or the larger network.

Proper pairing of timestamps must be maintained for both the DELAY REQUEST and SYNC packets and current PTP mechanisms used to associate timestamps have weaknesses. When a DELAY REQUEST message is sent out from the slave clock, many hardware timestamping implementations store the transmit time associated with the DELAY REQUEST message (i.e., $t_3$ in FIG. 4) in a queue on the slave clock. The master clock receives the DELAY REQUEST packet, notes the ingress time (i.e., $t_4$ in FIG. 4) and returns this value as a timestamp in a DELAY RESPONSE message. When the DELAY RESPONSE message is received by the slave clock, the transported timestamp must be correctly paired with a transmit timestamp from the queue. Similarly, with a FOLLOW UP message, the transported hardware-generated value of $t_1$ must be paired with the associated reception time of the associated SYNC message. As explained previously, if the timestamps cannot be paired, additional timing information must be exchanged. Further, an incorrect pairing of timestamps can lead to system underperformance or even a catastrophic failure. Moreover, the likelihood of a failure (or underperformance) of the servo loop due to incorrect pairing increases in situations where anomalous messages (e.g., SYNC or FOLLOW UP messages) are received at a network entity. In one example scenario, such anomalous messages may be produced due to a default behavior of a network component, e.g., a switch, that is configured to broadcast the timing messages to other network entities when the target device malfunctions and/or goes offline. As a result, a network entity that receives such additional anomalous packets may have a difficult time sorting and correlating the received timestamps with the proper transaction.

It is, therefore, advantageous to place timestamps within the exchanged messages which eliminates the need to correlate timestamps. It is also advantageous to reduce, as much as possible, the messaging necessary to complete a transaction and to reduce the number of transactions, both of which reduce the number of timestamp correlations that must occur Both goals may be accomplished, at least in-part, by directly inserting timestamps that are produced by a hardware time stamping mechanism into one or more messages that are exchanged between the two clocks. The hardware mechanism can be configured to insert the timestamps upon egress and/or ingress of the messages from the corresponding clocks, thereby eliminating a need for the transmission of additional messages that are exclusively intended to carry the timestamp values. For example, with reference with FIG. 4, the need for transmitting a FOLLOW UP 408 message can be eliminated by inserting an accurate hardware-generated timestamp, $t_1$, into the SYNC 406 message.

In addition to reducing the number of exchanged messages, it is also advantageous to generate and exchange some or all of the necessary timestamps together, or within a short time of each other. Such a proximity in time enables a more efficient implementation and usage of system resources. In particular, the incoming and outgoing packets can be processed faster with fewer computational cycles and reduced memory requirements. In addition, if the timestamps are apart in time, there is a higher likelihood of encountering differing amounts of network traffic which will violate basic assumptions of network characteristics, such as the symmetry assumption that is formulated in Equation (4). As a result, the accuracy of the resulting estimations can become questionable. As such, the proximity of the time values can also facilitate the estimation of statistical timing parameters, such as the expected slave clock offset value given by Equation (5), both in terms of the speed of convergence of the estimates, as well as the accuracy of the estimations.

The disclosed embodiments facilitate synchronization between two or more network entities by reducing the number of timing synchronization messages that are exchanged between those entities. The disclosed embodiments further enable the exchange of timing information that is generated and transmitted based on the needs of the slave entities. Moreover, according to the disclosed embodiments, the generation, transmission and processing of the various timing information are all carried out closely in time, thereby improving computational efficiency and overall accuracy of timing synchronization operations. Further, some of the enclosed embodiments simplify the pairing of transmission and reception timestamps for any particular message exchange and, therefore, these embodiments reduce the risk of PTP failure and/or under-performance.

Figure 5:
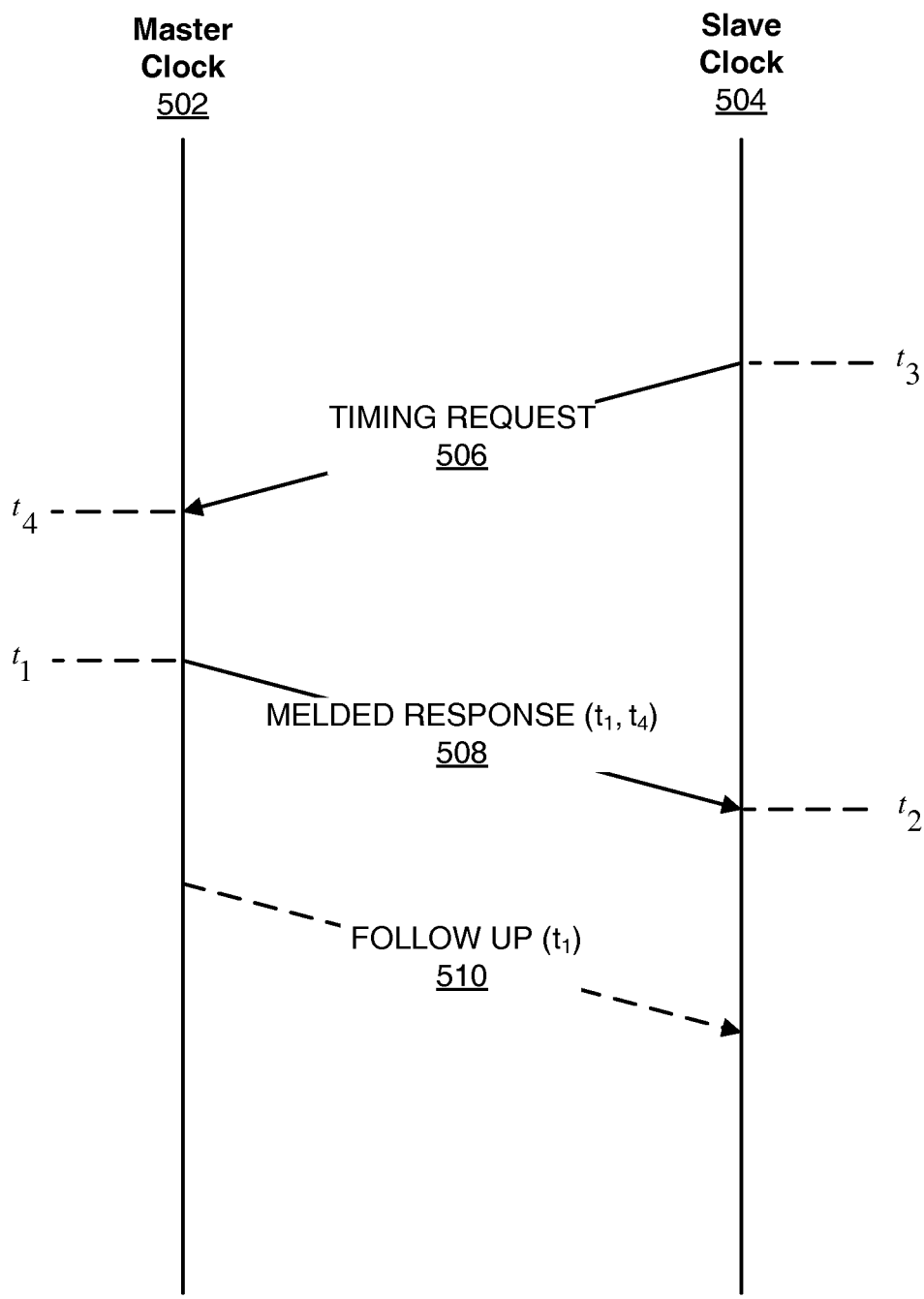
FIG. 5 is a diagram illustrating the exchange of timing information in accordance with an exemplary embodiment.

FIG. 5 illustrates the exchange of timing information in accordance with an example embodiment. In the example embodiment of FIG. 5, the slave clock 504 drives the point to point protocol rather than the master clock 502. In particular, the slave clock 504 initiates and maintains the exchange of timing information with the master clock 502 at a rate determined by the needs of the control loop at the slave clock 504. To this end, the slave clock 504 transmits a TIMING REQUEST 506 message to the master clock 502. In response to the reception of the TIMING REQUEST 506 message, the master clock 502 transmits a MELDED RESPONSE 508 message that comprises both $t_1$ and $t_4$ timestamps. In this way, the MELDED RESPONSE 508 message includes the functionalities of both the DELAY RESPONSE and SYNC messages that are depicted in FIG. 4. According to the example embodiment that is depicted in FIG. 5, at startup, the slave clock 504 can immediately send one or more TIMING REQUEST 506 messages to the master clock 502, which can then transmit one or more MELDED RESPONSE 508 messages to the slave clock 504.

The above described mechanism of FIG. 5 enables the slave clock 504 to gather a large amount of timing information at a pace that is suited for the slave clock 504. In particular, the slave clock 504 can transmit TIMING REQUEST 506 messages without negotiating a particular transmission rate with the master clock 502 and, therefore, can transmit such TIMING REQUEST 506 messages and receive the corresponding MELDED RESPONSE 508 messages at a faster, a slower or at any desired pace compared to systems that utilize the IEEE 1588 protocol. For example, the exchange of information at a faster rate enables a faster convergence of the control loop at the slave clock 504 and, therefore, allows a faster acquisition or readjustment of clock synchronization. Once the slave clock 504 has acquired synchronization, the control loop at the slave clock 504 can reduce the rate of TIMING REQUEST 506 messages and, therefore, reduce network utilization.

The rate of message exchange between the slave clock 504 and master clock 502 may also be modified based on other system considerations. Such considerations include, but are not limited to, the processing load of the master or slave entities, the network traffic, the network transmission quality, and the like. For example, if network traffic conditions are such that messages can be exchanged with a low latency, it may be advantageous to quickly exchange as many needed timing messages as possible to ensure fast and accurate convergence of synchronization computations. In another example, the exchange of information may be carried out at a slower pace if due to, for example, higher priority operations, the slave clock 504 is temporarily not capable of processing the incoming timing information.

A slave clock 504 that operates pursuant to the exemplary embodiment of FIG. 5, therefore, collects all four timestamps through the exchange of only two messages. In some embodiments, the timestamp $t_1$ may further be conveyed to the slave clock 504 using a separate transmission. To this end, a FOLLOW UP 510 message may be transmitted from the master clock 502 to the slave clock 504 after the transmission of the MELDED RESPONSE 510 message. In scenarios where the hardware at the master clock 502 does not support inclusion of timestamp $t_1$ in the MELDED RESPONSE 510 message, timestamp $t_1$ may be embedded into the FOLLOW UP 510 message using a precision timestamping hardware.

It should be also noted that in some embodiments, the MELDED RESPONSE 510 message can be cast to appear as a SYNC message upon egress from the master clock. This way, no hardware/firmware updates at the master clock are needed since the existing PTP hardware at the master clock continues to insert timestamp $t_1$ into the MELDED RESPONSE 510 message. Analogously, casting the MELDED RESPONSE 510 message as a SYNC message enables the existing PTP hardware at slave clock to insert a timestamp $t_2$ upon ingress.

Figure 6:
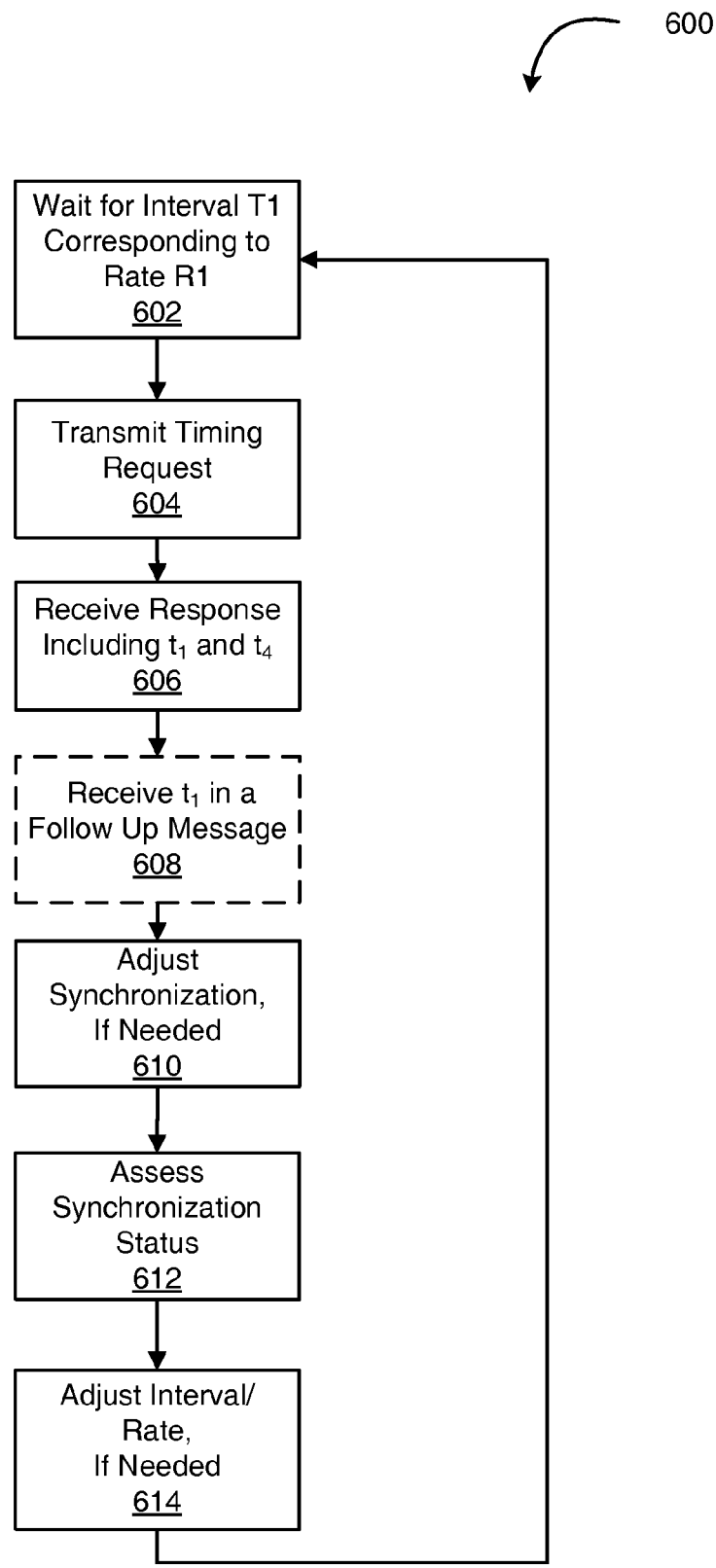
FIG. 6 is a block diagram illustrating operations that are conducted in accordance with an exemplary embodiment.

FIG. 6 illustrates a flow diagram of the operations that may carried out to acquire and maintain timing synchronization in accordance with an exemplary embodiment. The process 600 of FIG. 6 may be carried out by a first entity that includes a slave clock. At 602, the process 600 waits for a particular interval, T1, corresponding to a particular transmit timing request rate (i.e., R1) before initiating a transmit timing request at step 604. Such a rate may be established, for example, based on the needs and/or capabilities of the slave clock. As noted earlier, the first entity (e.g., the slave clock) can unilaterally initiate a transaction without a need to negotiate with a second entity (e.g., the master clock). Therefore, at the very first iteration of the process 600, step 602 may be skipped and the transmit timing request of step 604 may be immediately transmitted. At 606, the first entity receives the timestamp values $t_1$ and $t_4$ as part of a melded response that is received from the second entity. As noted earlier, $t_1$ represents the time at which the response message of step 606 was transmitted from the second entity, and $t_4$ represents the time at which the timing request message of step 604 was received at the second entity. At 608, a follow up message, which is optionally generated at the second entity, is received at the first entity. The contents of the follow up message includes a hardware timestamp value for $t_1$. Such an optional message may be received in configurations where a hardware timestamp cannot be directly included in the melded response message.

At 610 the first entity's (e.g., the slave clock's) synchronization/clock parameters may be adjusted to ensure proper synchronization with the second entity's clock (e.g., the master clock). Such an adjustment may be based on, for example, the value and confidence level associated with the estimation of synchronization parameters. In one example, the adjustment of step 610 is only carried out if the confidence level associated with an estimate of the synchronization parameter is outside of a particular confidence interval. At 612, the synchronization status is assessed. For example, synchronization uncertainty is assessed based on factors such as rate of change of temperature and/or timestamp history. At 614, the wait interval, T1, (or the corresponding rate R1), can be adjusted based on synchronization uncertainty and additional environmental factors. By the way or example, and not by limitation, such additional factors can include the processing load of the network entities, network traffic, network quality and the like. The process 600 then returns to 602 to repeat steps 602 through 614. The process 600, which can run continuously and repeatedly from PTP servo startup until PTP servo shutdown, enables the assessment and updating of the transaction rate (or time interval) every time a set of timestamps associated with a transaction is collected and/or every time an adjustment to clock synchronization is effected.

Figure 11:
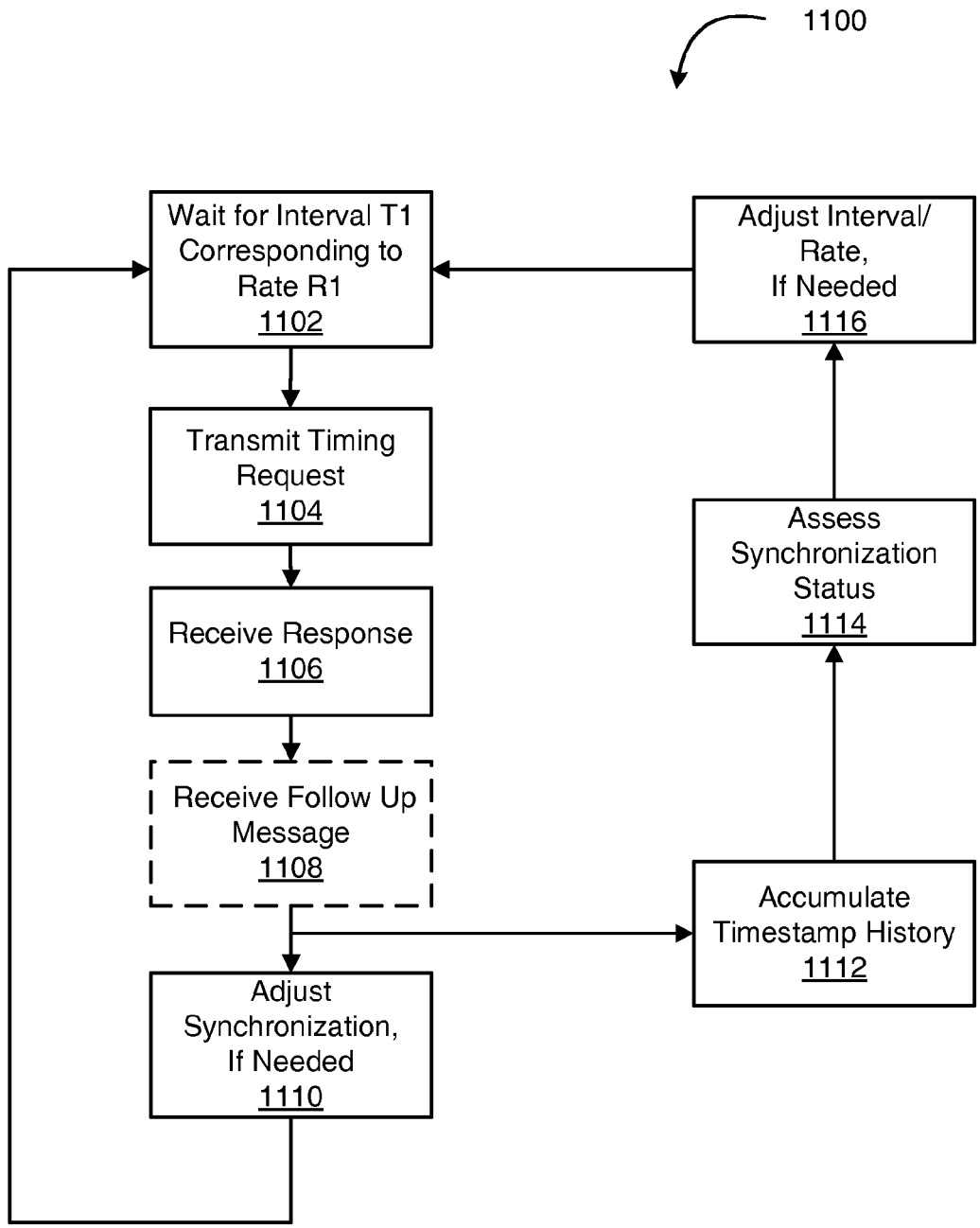
FIG. 11 is a block diagram illustrating operations that are conducted in accordance with another exemplary embodiment.

FIG. 11 illustrates another process 1100 that may also be carried out by a first entity (e.g., a slave clock) to maintain clock synchronization with a second entity (e.g., a master clock). Some of the steps in FIG. 1100 (e.g., steps 1102 to 1110) are identical to those in FIG. 6. However, the remaining operations of process 1100 can be carried out separately from the operations of FIG. 6.

Similar to the process 600 of FIG. 6, at 1102, the process 1100 waits for a particular interval, T1, corresponding to a particular transmit timing request rate (i.e., R1) before sending a transmit timing request at step 1104. As noted earlier, at the very first iteration of the process 1100, step 1102 may be skipped and the transmit timing request of step 1104 may be immediately transmitted. At 1106, the first entity receives a melded response that includes the timestamp values $t_1$ and $t_4$. At 1108, a follow up message, which is optionally generated at the second entity, is received at the first entity. The contents of the follow up message includes a hardware timestamp value for $t_1$. At 1110 the first entity's (e.g., the slave clock's) synchronization/clock parameters may be adjusted to ensure proper synchronization with the second entity's clock (e.g., the master clock). Upon the completion of step 1110, the process 1100 returns to step 1102.

Upon the receipt of the optional follow up message at 1108, the process 1100 further continues to step 1108, where the timestamp history is accumulated. At 1114, based on an ensemble of accumulated timestamps, synchronization status is assessed. For example, at step 1114, synchronization uncertainty can be assessed based on factors such as fluctuations in the temperature rate, timestamp history and the like. At 1116, the desired rate of transmit timing request is calculated based on the synchronization uncertainty and/or other environmental factors such a processing loads of the network entities, network traffic, network quality and the like. Further, at step 1116, the rate of transmit timing request (or the corresponding time interval) is adjusted, if needed, to conform to the desired rate/interval. The process then returns to step 1102. Similar to the operations that were described in connection with FIG. 6, the process 1100 of FIG. 11 can continue ad-infinitum from PTP servo startup until PTP servo shutdown. Further, the outer loop (i.e., steps 1112 to 1116) can run at a completely separate rate than the actual clock control loop (i.e., steps 1102 to 1110).

The operations that are depicted in FIGS. 6 and 11 enable a slave clock to rapidly and unilaterally initiate a request for timing information, and to further adjust the rate of such requests immediately, without negotiating with the master clock. In practical implementations, due to processing delays, small delays may occur between the point at which the PTP servo loop decides that a new rate is required and the time that the new rate is implemented. The operations that are depicted in FIGS. 6 and 11 also enable the slave clock to change the transmit request rate within an unlimited and continuous range of values, as often as needed. However, from a practical point view, due to limitations of digital signal processing operations, such a continuous range of values is often represented by a discrete range of transmission rate values with small granularity. Moreover, such a discrete range of transmission rate values need not conform to a pre-set range or a table of values. As such, each slave device can unilaterally select a particular transmission rate value, within any range of values, to accommodate its synchronization needs.

Figure 7:
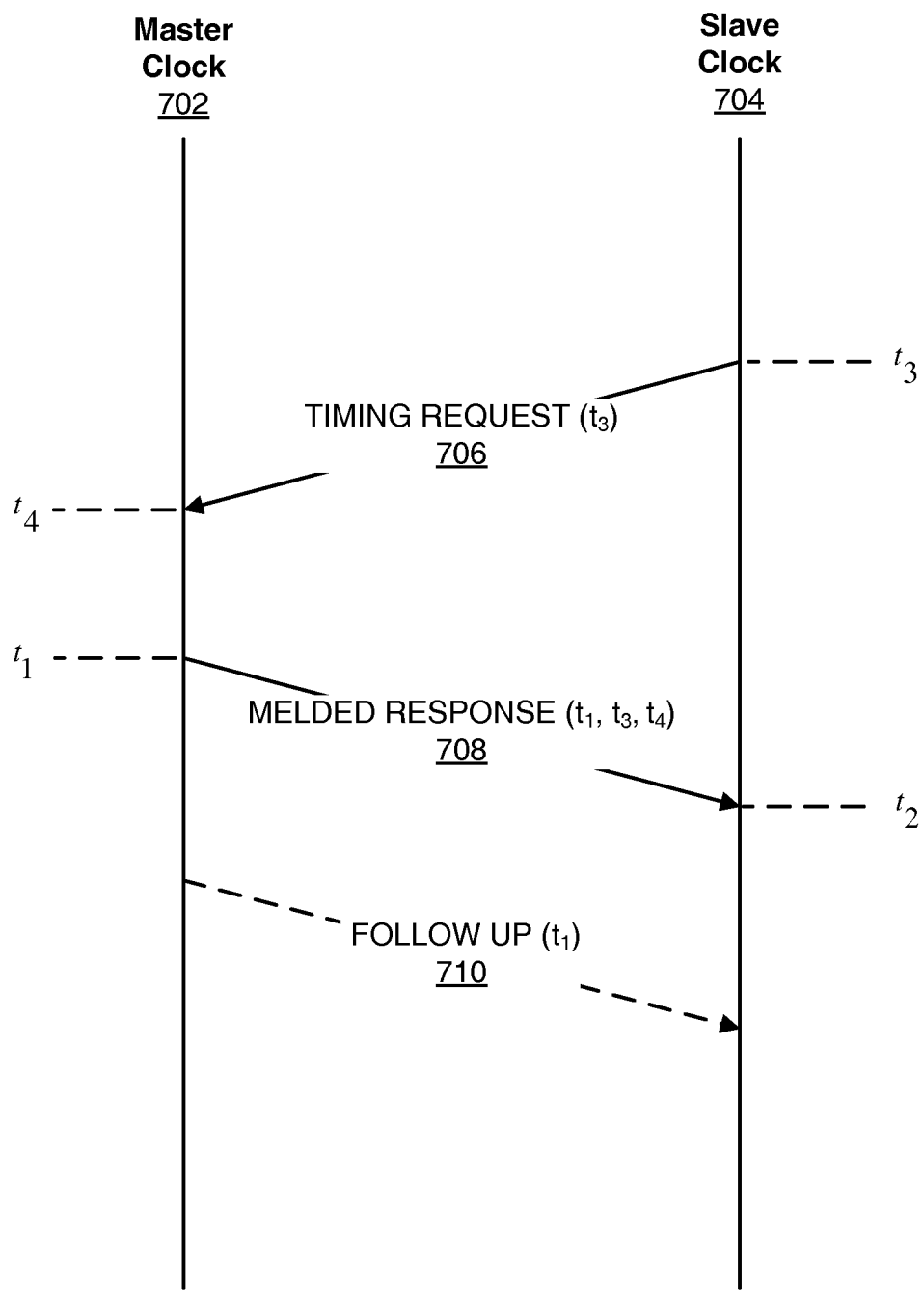
FIG. 7 is a diagram illustrating the exchange of timing information in accordance with another exemplary embodiment.

As noted earlier, a slave clock, upon the reception of a response message from the master clock, must associate the timestamp of the received message to a corresponding timestamp of a transmitted message. In some embodiments, the pairing of timestamps is further facilitated by incorporating a plurality of related timestamps in a single message. FIG. 7 illustrates a sequence of timing messages that are exchanged between a slave clock 704 and a master clock 702 in accordance with an exemplary embodiment. Similar to the diagram of FIG. 5, the slave clock 704 initiates a request for timing information by transmitting a TIMING REQUEST 706 message to the master clock 702. The TIMING REQUEST 706 message contains the timestamp $t_3$, which is indicative of the time at which the TIMING REQUEST 706 message was generated (and transmitted). Upon the reception of the TIMING REQUEST 706 message, the master clock 704 generates a MELDED RESPONSE 708 message that comprises three timestamps: $t_3$, as well as, $t_1$ and $t_4$, where the latter timestamps are associated with the generation of the MELDED RESPONSE 708 message and the reception of the TIMING REQUEST 706 message, respectively. Upon the reception of the MELDED RESPONSE 708 message, the hardware timestamping mechanism at the slave clock 704 can further insert the timestamp $t_2$ into the received MELDED RESPONSE 708 message. As such, once the MELDED RESPONSE 708 message is received at the slave clock 704, all four timestamps, $t_1$, $t_2$, $t_3$ and $t_4$, are readily available to the slave clock 704, thereby eliminating the need to conduct additional operations to find and correlate the timestamps associated with the outgoing and incoming messages. The availability of all four timestamps as part of a single message further eliminates the possibility of incorrect pairing of timestamps and, thus, improves the reliability of synchronization operations. FIG. 7 further illustrates the transmission of an optional FOLLOW UP 710 message containing a hardware generated value of timestamp $t_1$ that is sent from the master clock 702 to the slave clock 704. Such a FOLLOW UP 710 message may be needed in certain systems that are not capable of directly incorporating the timestamp $t_1$ into the MELDED RESPONSE 708.

Figure 8:
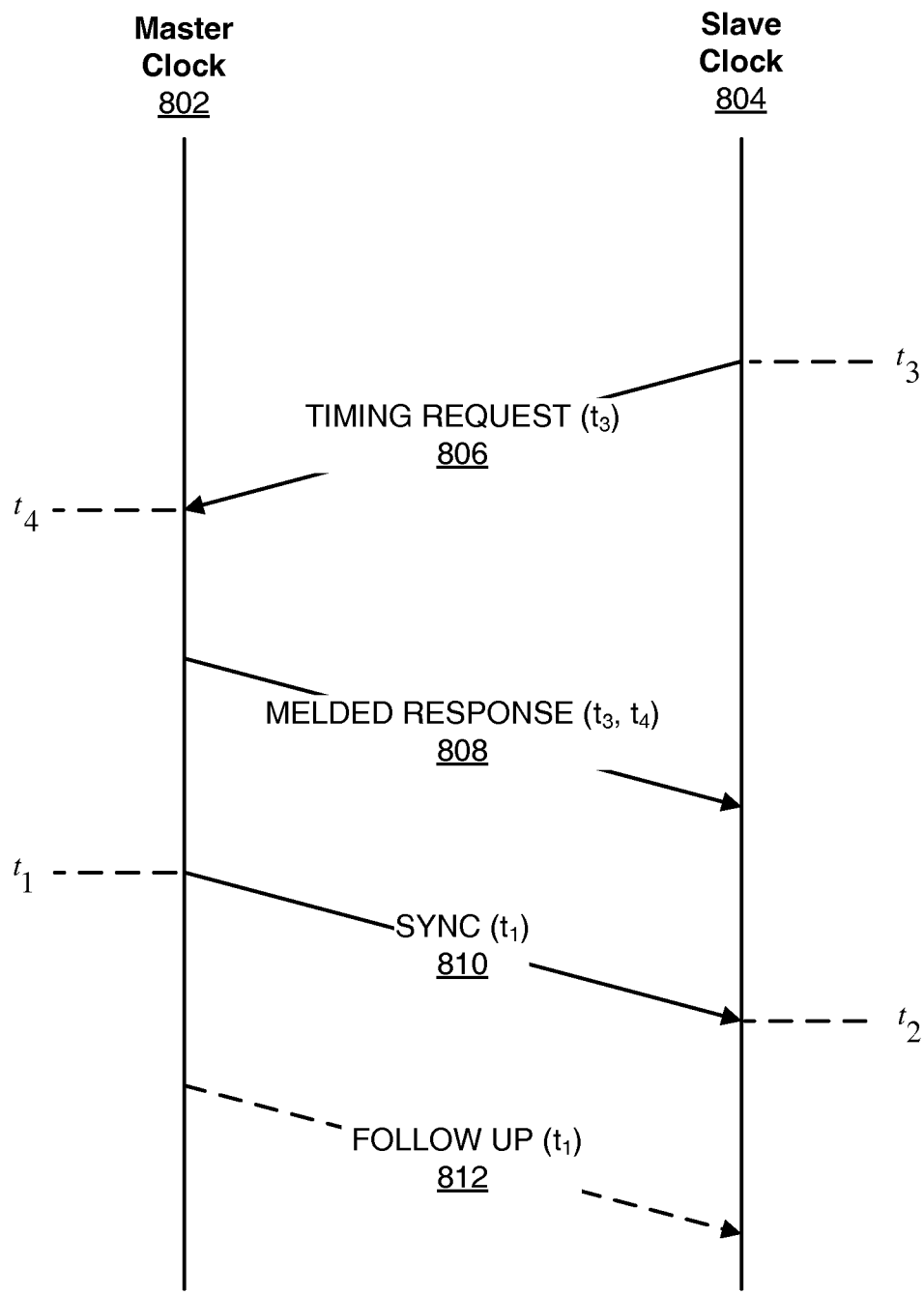
FIG. 8 is a diagram illustrating the exchange of timing information in accordance with another example embodiment.

FIG. 8 illustrates another sequence of timing messages that are exchanged between a slave clock 804 and a master clock 802 in accordance with an exemplary embodiment. Similar to FIG. 7, a TIMING REQUEST 806 message is initiated by the slave clock 804 and transmitted to the master clock 802. As with previously described embodiments of FIG. 5 and FIG. 7, the slave clock 804 is capable of controlling the transmission frequency of the TIMING REQUEST 806 messages that can be adapted based on the needs of the slave clock 804 or external factors, such as network conditions. Upon the reception of the TIMING REQUEST 806 message, the master clock 802 sends both a MELDED RESPONSE 808 and a SYNC 810 message to the slave clock 804. The MELDED RESPONSE 808 message includes the timestamps $t_3$ and $t_4$. As noted in connection with FIG. 7, the inclusion of $t_3$ in the MELDED RESPONSE 808 message facilitates the pairing of timestamps at the slave clock 804. In one variation of this embodiment, timestamp $t_3$ is not included in the MELDED RESPONSE 808 message. In this variation, the slave clock 804 must associate the received timestamp $t_4$ with timestamp $t_3$ that is stored in the slave clock's buffer.

The master clock 802 also transmits a SYNC 810 message separately from the MELDED RESPONSE 808 message to convey the timestamp $t_1$ to the slave clock 804. Similar to the previously discussed embodiments of FIG. 5 and FIG. 7, FIG. 8 also illustrates a FOLLOW UP 812 message, which can be optionally transmitted to the slave clock 804 to provide a hardware generated timestamp $t_1$ to the slave clock 804.

Figure 9:
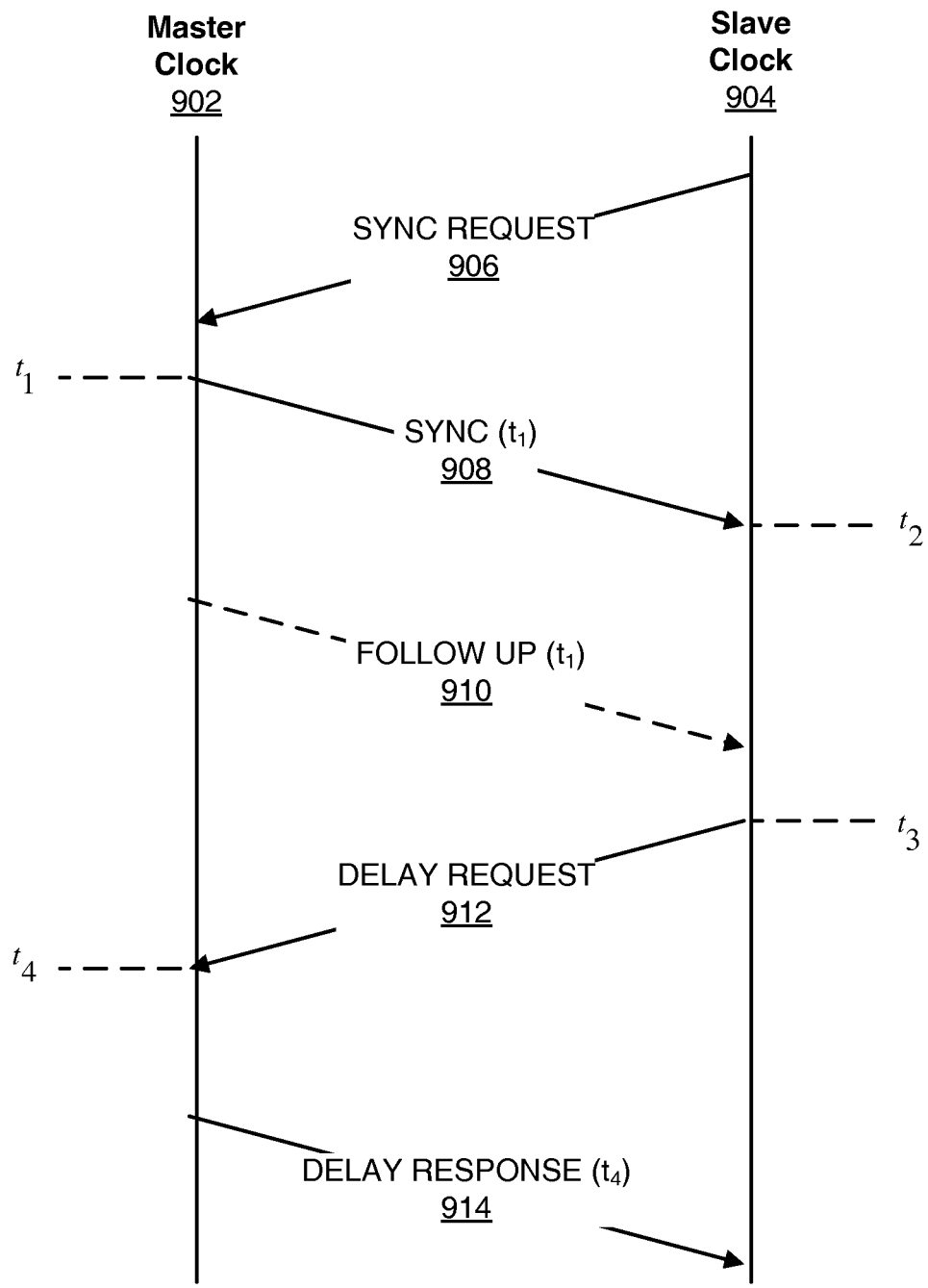
FIG. 9 is a diagram illustrating the exchange of timing information in accordance with another example embodiment.

In some embodiments, a slave clock can still adaptively control the exchange rate of timing information by generating a special type of message that is transmitted to a master clock. FIG. 9 shows an exemplary procedure for the exchange of timing messages between a master clock 902 and a slave clock 904 that is initiated by the transmission of a special message, called SYNC REQUEST 906 message. Upon reception of the SYNC REQUEST 906 message, the master clock 902 is triggered to transmit various messages to deliver the necessary timestamps to the slave clock 904. In FIG. 9, the SYNC REQUEST 906 message triggers the transmission of a SYNC 908 message, which can be followed by an optional FOLLOW UP 910 message containing a hardware generated value of timestamp $t_1$. Next, the slave clock 904 transmits a DELAY REQUEST 912 message to the master clock 902, which triggers the transmission of a DELAY RESPONSE 914 message from the master clock 902 to the slave clock 904.

Figure 12:
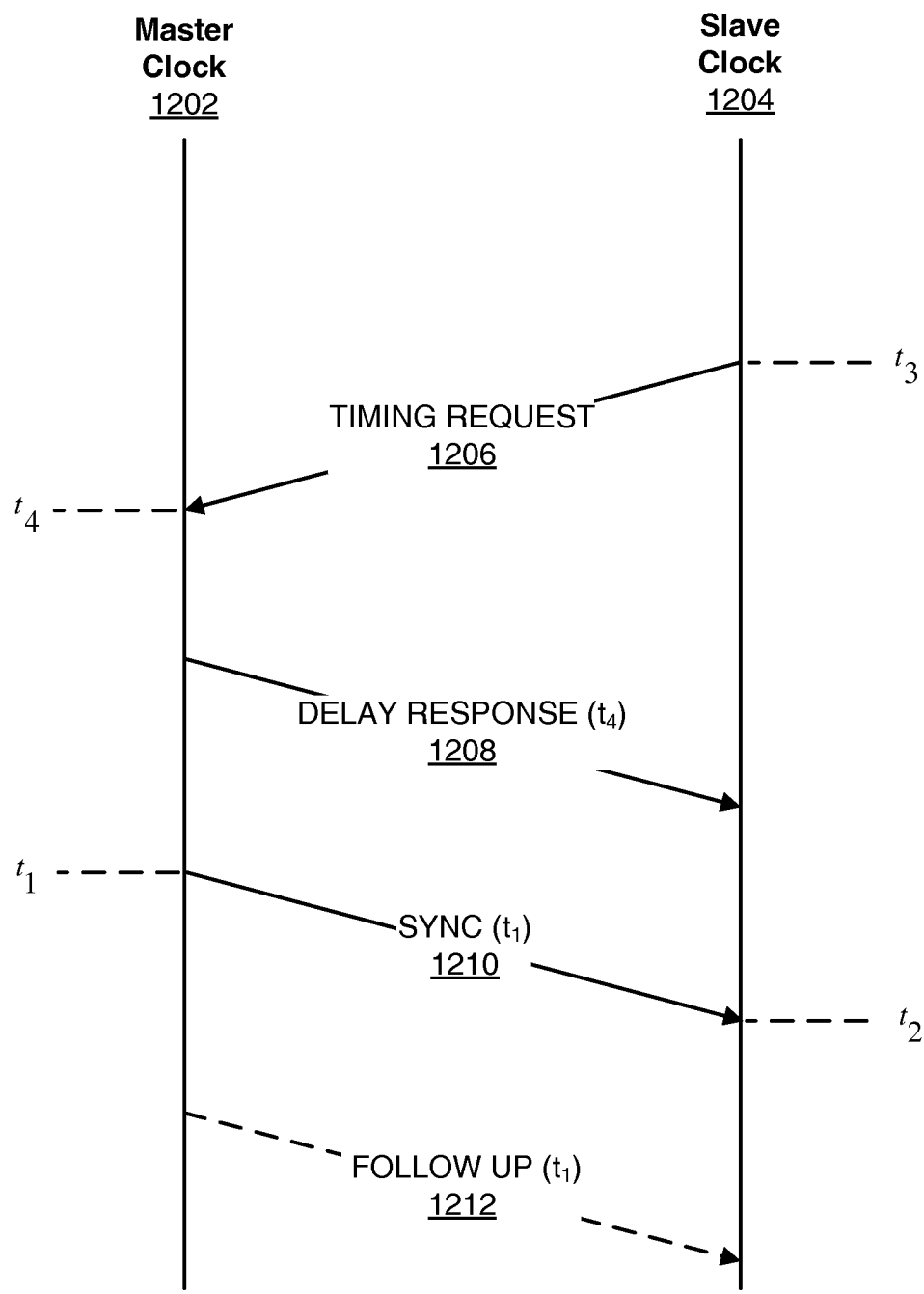
FIG. 12 is a diagram illustrating the exchange of timing information in accordance with another example embodiment.

FIG. 12 illustrates another exemplary procedure for the exchange of timing messages between a master clock 1202 and a slave clock 1204. The exchange of timing information is triggered by the slave clock 1204, at a rate determined by the slave clock 1204, without negotiating with the master clock 1202. A transaction is triggered by sending a TIMING REQUEST 1206 message to the master clock 1202. The TIMING REQUEST 1206 message can be cast as a delay request message. In response to the TIMING REQUEST 1206 message, the master clock transmits a DELAY RESPONSE 1208 message that includes the reception timestamp, $t_4$, of the TIMING REQUEST 1206 message. In addition, a SYNC 1210 message is sent from the master clock 1202 to the slave clock 1204 that includes the transmit initiation timestamp, $t_1$, of the SYNC 1210 message. Further, in implementations that do not support direct placement of timestamp $t_1$ in the SYNC 1210 message, a FOLLOW UP 1212 message is also sent from the master clock 1202 to the slave clock 1204. The exemplary procedure that is described in connection with FIG. 12 allows the use of timing packets of existing PTP protocols but is carried out without requiring a negotiation process between the slave clock 1204 and the master clock 1202. Also, as noted earlier, the slave clock 1204 can select any transmission rate value associated with the TIMING REQUEST 1206 messages from within a virtually unlimited and continuous range of values. Such a transmit request rate can be adaptively changed by the slave clock 1204 to accommodate its synchronization needs and/or based on processing loads or network conditions.

It should be noted that in connection with FIGS. 5, 7, 8, 9 and 12 of the present application, for simplicity, abbreviations $t_1$, $t_2$, $t_3$ and $t_4$ are used to denote transmit initiation times and reception times of various exchanged messages. However, it is understood that subscripts 1, 2, 3, and 4 do not necessarily represent the sequential transmission, reception and/or generation order of the exchanged timestamps. For example, as illustrated in FIG. 5, the timestamp $t_1$ is generated after the timestamp $t_4$. Moreover, for different example embodiments, the labels $t_1$, $t_2$, $t_3$ and $t_4$, may represent transmit initiation and reception timestamps for different messages. For example, in connection with FIG. 5, $t_1$ represents a MELDED RESPONSE 508 transmit initiation time, whereas in connection with FIG. 8, $t_1$ represents a SYNC 810 transmit initiation time. Similarly, in connection with FIG. 5, $t_4$ represents a TIMING REQUEST 506 reception time, whereas in connection with FIG. 9, $t_4$ represents a DELAY REQUEST 912 reception time.

The provided embodiments enable the operations of slave clocks with mixed operational capabilities. That is, a slave entity that is configured to operate in accordance with the disclosed embodiments can readily operate in a network that comprises both conventional master entities (i.e., capable of only providing constant-rate timing information) and master entities that are capable of responding to the slave entity's requests on an as-needed basis. To this end, the slave device and/or the master device may carry out negotiations to determine if one or both devices are capable of supporting the new timing exchange features. For example, broadcast, multicast or unicast messages may be transmitted to announce and/or ascertain the capabilities of particular network entities. Such discovery capabilities enables a slave clock to, for example, initiate a synchronization procedure with a master clock that only operates according to a conventional IEEE 1588 protocol. However, if a master clock that is capable of providing variable rate timing data becomes available on the network, the slave clock may discover the new master clock and exchange timing information in accordance with the disclosed embodiments.

Further, the above-noted discovery capability, enables conducting timing synchronization operations in a network that comprises a mix of slave devices with new and conventional capabilities. In particular, when communicating with conventional slave devices, the master device can continue to transmit sync messages at a constant rate. At the same time, the master device can conduct discovery negotiations with the slave devices that operate in accordance with the disclosed embodiments. Depending on the discovered capabilities, the master device can then respond to a delay request message with a sync packet, respond to a sync packet request with a sync packet, or adapt its sync packet rate to a rate change request from the slave clock.

Figure 10:
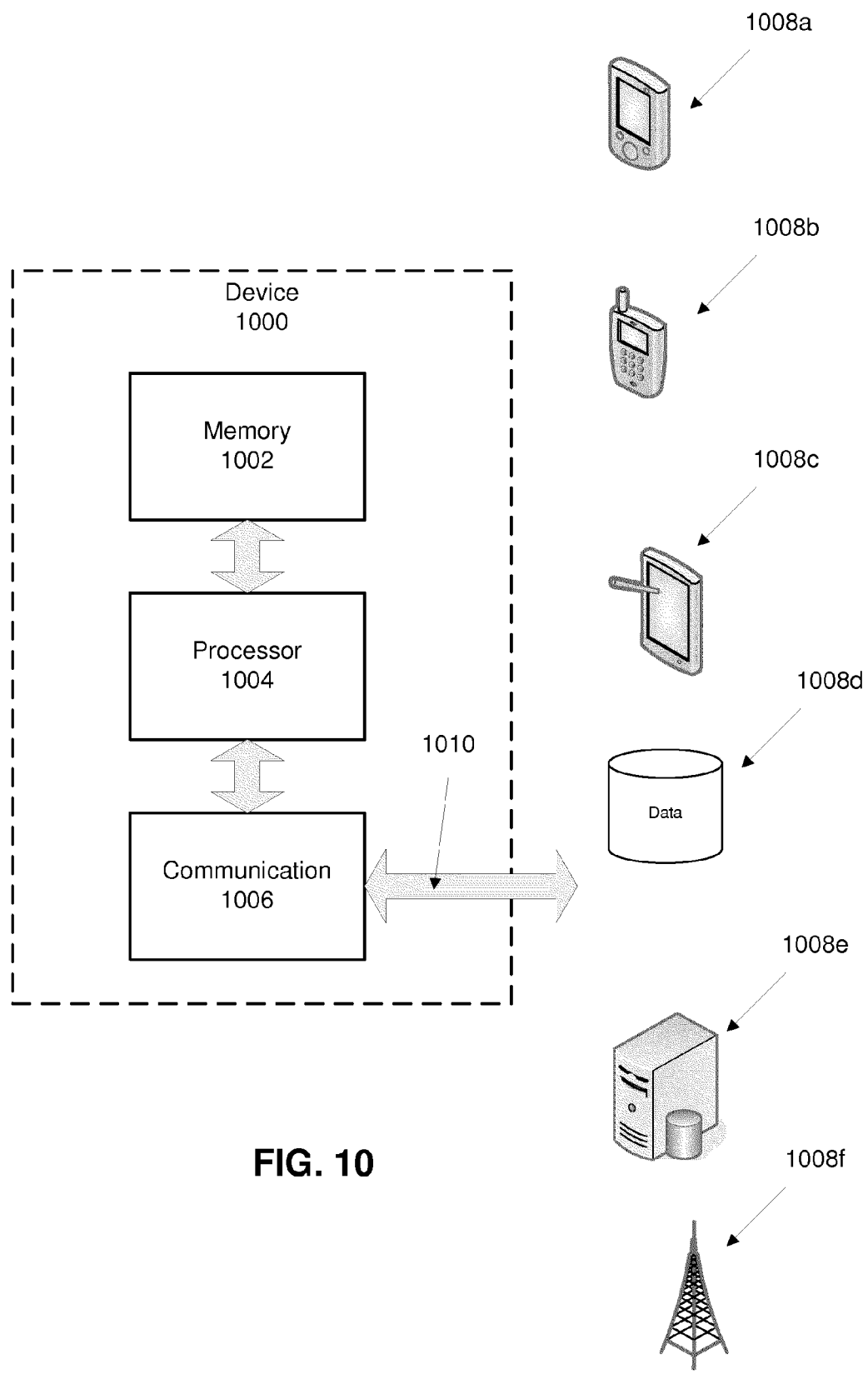
FIG. 10 illustrates a device within which the disclosed embodiments can be implemented.

It is understood that the various disclosed embodiments may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 10 illustrates a block diagram of a device 1000 within which the various embodiments of the present invention may be implemented. The device 1000 comprises at least one processor 1002 and/or controller, at least one memory 804 unit that is in communication with the processor 1002, and at least one communication unit 806 that enables the exchange of data and information, directly or indirectly, with other entities, devices and networks 1008a to 1008f. For example, the device 1000 may be in communication with mobile devices 1008a, 1008b, 1008c, with a database 1008d, a sever 1008e and a radio node 1008f. The communication unit 1006 may provide wired and/or wireless communication capabilities, through communication link 1010, in accordance with one or more communication protocols and, therefore, it may comprise the proper transmitter/receiver antennas, circuitry and ports, as well as the encoding/decoding capabilities that may be necessary for proper transmission and/or reception of data and other information.

The exemplary device 1000 that is depicted in FIG. 10 may be integrated as part of the various entities that are depicted in FIGS. 1-3, including an access controller 114, an access point 101, 102, 104, 106, 108 and 112, a radio node controller 204a and 204b, a Node B 206a and 206b, a user equipment 208a, 208b and 208c, a services node 304, a radio node 306a, 306b and 306c, and/or an operator 308. The device 1000 of FIG. 10 may reside as a separate component within or outside the above-noted entities that are depicted in FIGS. 1-3. The device 1000 of FIG. 10 may also incorporate a master entity, comprising a master clock, or a slave entity, comprising a slave clock, that operate in accordance with the disclosed embodiments. Further, the exemplary device 1000 of FIG. 10 may also comprise additional components, such as a master or a slave clock that are not explicitly depicted in FIG. 10.

Similarly, the various components or sub-components within each module of the present invention may be implemented in software, hardware, firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the disclosed embodiments can be implemented as computer program products that reside on a non-transitory computer-readable medium. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. For example, the disclosed embodiments are equally applicable to networks that utilize different communication technologies, including but not limited to UMTS (including R99 and all high-speed packet access (HSPA) variants), as well as LTE, WiMAX, GSM and the like. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   transmitting one or more requests from a slave device to a master device in a communication network, each request having a corresponding request transmit initiation time and a request reception time;
   in response to each of the transmitted requests, receiving, at the slave device, a melded response from the master device, each melded response having a corresponding response transmit initiation time and a response reception time, wherein each melded response comprises a first value representing the request reception time and a second value representing the response transmit initiation time;
   estimating, at the slave device, a synchronization parameter value and determining a confidence level associated with the synchronization parameter value in accordance with the request transmit initiation time, the request reception time, the response reception time and the response transmit initiation time; and
   if the confidence level falls outside an acceptable range, adjusting clock parameters at the slave device to establish a timing synchronization between the slave device and the master device.

2. The method of claim 1, wherein the one or more requests are transmitted based on a transmission rate determined by the slave device.

3. The method of claim 2, wherein the transmission rate is modified by the slave device after collecting at least a single set of the request transmit initiation time, the request reception time, the response reception time and the response transmit initiation time.

4. The method of claim 2, wherein the slave device determines the transmission rate by changing the transmission rate within a discrete range of transmission rate values with small granularity.

5. The method of claim 2, wherein the transmission rate is modified by the slave device without negotiating with the master device.

6. The method of claim 2, wherein the transmission rate is determined by the slave device in accordance with a timing synchronization status of the slave clock, a processing capability of the slave clock and/or a network condition.

7. The method of claim 1, wherein the timing synchronization is assessed by the slave device after collecting at least a single set of the request transmit initiation time, the request reception time, the response reception time and the response transmit initiation time.

8. The method of claim 1, wherein the melded response further comprises the request transmit initiation time.

9. The method of claim 1, wherein, upon reception of the melded response, a value representing the response reception time is incorporated into the melded response by the slave device.

10. The method of claim 1, further comprising:
    receiving, at the slave device, a follow up message from the master device, wherein the follow up message comprises a hardware generated value of the response transmit initiation time.

11. The method of claim 1, wherein the timing synchronization is established by:
    collecting a plurality of request transmit initiation times, request reception times, response reception times and the response transmit initiation times; and
    conducting a statistical operation to produce an estimation of a synchronization parameter.

12. The method of claim 11, wherein
    the synchronization parameter is an offset parameter representing a difference between timing measurements conducted at the slave device and timing measurements conducted at the master device; and
    the statistical operation comprises generating an expected value of the offset parameter.

13. A method, comprising:
    receiving one or more requests from a slave device at a master device in a communication network, each request having a corresponding request transmit initiation time and a request reception time;
    in response to each request, transmitting a melded response from the master device to the slave device, each melded response having a corresponding response transmit initiation time and a response reception time, wherein
    each melded response comprises a first value representing the request reception time and a second value representing the response transmit initiation time;
    estimating a synchronization parameter value at the slave device and determining a confidence level associated with the synchronization parameter value in accordance with the request transmit initiation time, the request reception time, the response reception time and the response transmit initiation time; and
    if the confidence level falls outside an acceptable range, adjusting clock parameters at the slave device to establish a timing synchronization between the slave device and the master device.

14. A method, comprising:
    transmitting one or more requests from a slave device to a master device in a communication network, each request having a corresponding request transmit initiation time and a request reception time;
    in response to each transmitted request:
        receiving, at the slave device, a melded response from the master device, each melded response comprising a first value representing the request reception time, and
        receiving, at the slave device, a synchronization message from the master device, each synchronization message having a corresponding synchronization transmit initiation time and a synchronization reception time, wherein each synchronization message comprises a value representing the synchronization transmit initiation time;
    estimating, at the slave device, a synchronization parameter value and determining a confidence level associated with the synchronization parameter value in accordance with the request transmit initiation time, the request reception time, the synchronization reception time and the synchronization transmit initiation time; and if the confidence level falls outside an acceptable range, adjusting clock parameters at the slave device to establish a timing synchronization between the slave device and the master device.

15. The method of claim 14, wherein the one or more requests are transmitted based on a transmission rate determined by the slave device.

16. The method of claim 15, wherein the transmission rate is modified by the slave device after collecting at least a single set of the request transmit initiation time, the request reception time, the synchronization reception time and the synchronization transmit initiation time.

17. The method of claim 15, wherein the slave device determines the transmission rate by changing the transmission rate within a discrete range of transmission rate values with small granularity.

18. The method of claim 15, wherein the transmission rate is modified by the slave device without negotiating with the master device.

19. The method of claim 15, wherein the transmission rate is determined by the slave device in accordance with a timing synchronization status of the slave clock, a processing capability of the slave clock and/or a network condition.

20. The method of claim 14, wherein the timing synchronization is assessed by the slave device after collecting at least a single set of the request transmit initiation time, the request reception time, the synchronization reception time and the synchronization transmit initiation time.

21. The method of claim 14, wherein each melded response further comprises a second value representing the request transmit initiation time.

22. The method of claim 14, further comprising:
receiving, at the slave device, a follow up message from the master device, wherein the follow up message comprises a hardware generated value of the synchronization transmit initiation time.

23. The method of claim 14, wherein the timing synchronization is established by:
collecting a plurality of request transmit initiation times, request reception times, synchronization reception times and the synchronization transmit initiation times; and
conducting a statistical operation to produce an estimation of a synchronization parameter.

24. The method of claim 23, wherein
the synchronization parameter is an offset parameter representing a difference between timing measurements conducted at the slave device and timing measurements conducted at the master device; and
the statistical operation comprises generating an expected value of the offset parameter.

25. A method, comprising:
transmitting one or more synchronization requests from a slave device to a master device in a communication network;
in response to each transmitted synchronization request:
receiving, at the slave device, a synchronization response from the master device, each synchronization response having a synchronization transmit initiation time and a synchronization reception time, wherein each synchronization response comprises a value representing the synchronization transmit initiation time, and
transmitting a delay request the slave device to the master device, each delay request having a delay request transmit initiation time and a delay request reception time;
receiving, at the slave device, a delay response message from the master device, wherein each delay response message comprises a value representing the delay request reception time; and
estimating, at the slave device, a synchronization parameter value and determining a confidence level associated with the synchronization parameter value in accordance with the synchronization transmit initiation time, the synchronization reception time, the delay request transmit initiation time and the delay request reception time; and
if the confidence level falls outside an acceptable range, adjusting clock parameters at the slave device to establish a timing synchronization between the slave device and the master device.

26. A method, comprising:
receiving one or more synchronization requests from a slave device at a master device in a communication network;
in response to each received synchronization request:
transmitting a synchronization response from the master device to the slave device, each synchronization response having a synchronization transmit initiation time and a synchronization reception time, wherein each synchronization response comprises a value representing the synchronization transmit initiation time,
receiving a delay request from the slave device at the master device, each delay request having a delay request transmit initiation time and a delay request reception time;
transmitting a delay response message from the master device to the slave device, wherein each delay response message comprises a value representing the delay request reception time;
estimating, at the slave device, a synchronization parameter and determining a confidence level associated with the synchronization parameter value in accordance with the synchronization transmit initiation time, the synchronization reception time, the delay request transmit initiation time and the delay request reception time; wherein
if the confidence level falls outside an acceptable range, clock parameters are adjusted at the slave device to establish a timing synchronization between the slave device and the master device.

27. A method, comprising:
transmitting one or more requests from a slave device to a master device in a communication network, the one or more requests having been transmitted at a transmission rate determined by the slave device without negotiating with the master device, each request having a corresponding request transmit initiation time and a request reception time;
in response to each of the transmitted requests:
receiving, at the slave device, a delay response from the master device, each delay response comprising a value representing the request reception time, and
receiving, at the slave device, a synchronization response from the master device, each synchronization response having a synchronization transmit initiation time and a synchronization reception time, wherein each synchronization response comprises a value representing the synchronization transmit initiation time; and estimating, at the slave device, a synchronization parameter value and determining a confidence level associated with the synchronization parameter value in accordance with the request transmit initiation time, the request reception time, the synchronization transmit initiation time and the synchronization reception time; and if the confidence level falls outside an acceptable range, adjusting clock parameters at the slave device to establish a timing synchronization between the slave device and the master device.

28. A computer program product, embodied on a non-transitory computer readable medium, comprising:

program code for transmitting one or more requests from a slave device to a master device in a communication network, each request having a corresponding request transmit initiation time and a request reception time;

program code for in response to each of the transmitted requests, receiving, at the slave device, a melded response from the master device, each melded response having a corresponding response transmit initiation time and a response reception time, wherein each melded response comprises a first value representing the request reception time and a second value representing the response transmit initiation time;

program code for estimating, at the slave device, a synchronization parameter value and determining a confidence level associated with the synchronization parameter value in accordance with the request transmit initiation time, the request reception time, the response reception time and the response transmit initiation time; and program code for, adjusting clock parameters at the slave device if the confidence level falls outside an acceptable range to establish a timing synchronization between the slave device and the master device.

29. A computer program product, embodied on a non-transitory computer readable medium, comprising:

program code for receiving one or more requests from a slave device at a master device in a communication network, each request having a corresponding request transmit initiation time and a request reception time;

program code for, in response to each request, transmitting a melded response from the master device to the slave device, each melded response having a corresponding response transmit initiation time and a response reception time, wherein each melded response comprises a first value representing the request reception time and a second value representing the response transmit initiation time;

program code for, estimating, at the slave device, a synchronization parameter value and determining a confidence level associated with the synchronization parameter value in accordance with the request transmit initiation time, the request reception time, the response reception time and the response transmit initiation time; and program code for, adjusting clock parameters at the slave device if the confidence level is outside an acceptable range to establish a timing synchronization between the slave device and the master device.

30. A computer program product, embodied on a non-transitory computer readable medium, comprising:

program code for transmitting one or more requests from a slave device to a master device in a communication network, each request having a corresponding request transmit initiation time and a request reception time;

program code for, in response to each transmitted request:

receiving, at the slave device, a melded response from the master device, each melded response comprising a first value representing the request reception time, and receiving, at the slave device, a synchronization message from the master device, each synchronization message having a corresponding synchronization transmit initiation time and a synchronization reception time, wherein each synchronization message comprises a value representing the synchronization transmit initiation time;

program code for estimating, at the slave device, a synchronization parameter value and determining a confidence level associated with the synchronization parameter value in accordance with the request transmit initiation time, the request reception time, the synchronization reception time and the synchronization transmit initiation time.

31. A computer program product, embodied on a non-transitory computer readable medium, comprising:

program code for transmitting one or more synchronization requests from a slave device to a master device in a communication network;

program code for, in response to each transmitted synchronization request:

receiving, at the slave device, a synchronization response from the master device, each synchronization response having a synchronization transmit initiation time and a synchronization reception time, wherein each synchronization response comprises a value representing the synchronization transmit initiation time, and transmitting a delay request the slave device to the master device, each delay request having a delay request transmit initiation time and a delay request reception time;

receiving, at the slave device, a delay response message from the master device, wherein each delay response message comprises a value representing the delay request reception time; and program code for estimating, at the slave device, a synchronization parameter value and determining a confidence level associated with the synchronization parameter value in accordance with the synchronization transmit initiation time, the synchronization reception time, the delay request transmit initiation time and the delay request reception time; and program code for, adjusting clock parameters at the slave device if the confidence level is outside an acceptable range, to establish a timing synchronization between the slave device and the master device.

32. A slave device, comprising:

a processor; and a memory comprising processor executable code, the processor executable code, when executed by the processor, configures the slave device to:

transmit one or more requests from the slave device to a master device in a communication network, each request having a corresponding request transmit initiation time and a request reception time;

in response to each of the transmitted requests, receive a melded response from the master device, each melded response having a corresponding response transmit initiation time and a response reception time, wherein each melded response comprises a first value representing the request reception time and a second value representing the response transmit initiation time;

estimate, at the slave device, a synchronization parameter value and determine a confidence level associated with the synchronization parameter value in accordance with the request transmit initiation time, the request reception time, the response reception time and the response transmit initiation time; and adjust clock parameters at the slave device if the confidence level is outside an acceptable range to establish a timing synchronization between the slave device and the master device.

33. A slave device, comprising:

a processor; and a memory comprising processor executable code, the processor executable code, when executed by the processor, configures the slave device to:

transmit one or more requests from the slave device to a master device in a communication network, each request having a corresponding request transmit initiation time and a request reception time;

in response to each transmitted request:
receive a melded response from the master device, each melded response comprising a first value representing the request reception time, and
receive a synchronization message from the master device, each synchronization message having a corresponding synchronization transmit initiation time and a synchronization reception time, wherein each synchronization message comprises a value representing the synchronization transmit initiation time;

estimate, at the slave device, a synchronization parameter value at the slave device and determine a confidence level associated with the synchronization parameter value in accordance with the request transmit initiation time, the request reception time, the synchronization reception time and the synchronization transmit initiation time; and adjust clock parameters at the slave device if the confidence level is outside an acceptable range to establish a timing synchronization between the slave device and the master device.

34. A slave device, comprising:

a processor; and a memory comprising processor executable code, the processor executable code, when executed by the processor, configures the slave device to:

transmit one or more synchronization requests from the slave device to a master device in a communication network;

in response to each transmitted synchronization request:
receive a synchronization response from the master device, each synchronization response having a synchronization transmit initiation time and a synchronization reception time, wherein each synchronization response comprises a value representing the synchronization transmit initiation time,
transmit a delay request to the master device, each delay request having a delay request transmit initiation time and a delay request reception time;
receive a delay response message from the master device, wherein each delay response message comprises a value representing the delay request reception time;

estimate, at the slave device, a synchronization parameter value and determine a confidence level associated with the synchronization parameter value in accordance with the synchronization transmit initiation time, the synchronization reception time, the delay request transmit initiation time and the delay request reception time; and adjust clock parameters at the slave device if the confidence level is outside an acceptable range to establish a timing synchronization between the slave device and the master device.

* * * * *